US011270488B2

(12) United States Patent
Guo et al.

(10) Patent No.: US 11,270,488 B2
(45) Date of Patent: Mar. 8, 2022

(54) EXPRESSION ANIMATION DATA PROCESSING METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventors: Yifan Guo, Shenzhen (CN); Nan Liu, Shenzhen (CN); Feng Xue, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/895,912

(22) Filed: Jun. 8, 2020

(65) Prior Publication Data

US 2020/0302668 A1      Sep. 24, 2020

Related U.S. Application Data

(63) Continuation of application No. PCT/CN2019/071336, filed on Jan. 11, 2019.

(30) Foreign Application Priority Data

Feb. 9, 2018    (CN) .................... 201810136285.X

(51) Int. Cl.
*G06T 13/40*      (2011.01)
*G06T 7/194*      (2017.01)
*G06T 13/20*      (2011.01)

(52) U.S. Cl.
CPC ............. *G06T 13/40* (2013.01); *G06T 7/194* (2017.01); *G06T 13/205* (2013.01); *G06T 2207/30201* (2013.01)

(58) Field of Classification Search
CPC ............................ G06T 19/006; G06T 13/40
See application file for complete search history.

(56) References Cited

U.S. PATENT DOCUMENTS 10,270,983 B1 *  4/2019  Van Os ................. H04N 5/2621
10,430,642 B2 * 10/2019  Bouaziz ............. G06K 9/00281
(Continued)

FOREIGN PATENT DOCUMENTS

CN       102479388 A      5/2012
CN       103198508 A      7/2013
(Continued)

OTHER PUBLICATIONS

The World Intellectual Property Organization (WIPO) International Search Report for PCT/CN2019/071336 dated Apr. 16, 2019 5 Pages (including translation).
(Continued)

*Primary Examiner* — Phi Hoang
(74) *Attorney, Agent, or Firm* — Anova Law Group, PLLC

(57) ABSTRACT

An expression animation data processing method is provided for a computer device. The method includes determining a location of a human face in an image and obtaining an avatar model; obtaining current expression data according to the location of the human face in the image and a three-dimensional face model; and obtaining expression change data from the current expression data. The method also includes determining a target split-expression-area that matches the expression change data, the target split-expression-area being selected from split-expression-areas corresponding to the avatar model; and obtaining target basic-avatar-data that matches the target split-expression-area. The method also includes combining the target basic-avatar-data according to the expression change data to generate to-be-loaded expression data; and loading the to-be-loaded expression data (Continued)

sion data into the target split-expression-area to update an expression of an animated avatar corresponding to the avatar model.

18 Claims, 16 Drawing Sheets

(56) References Cited

U.S. PATENT DOCUMENTS

| | | | |
|---|---|---|---|
| 10,521,948 B2* | 12/2019 | Rickwald | G06T 13/40 |
| 10,636,192 B1* | 4/2020 | Saragih | G06T 17/00 |
| 2011/0296324 A1* | 12/2011 | Goossens | G06F 3/04883 |
| | | | 715/763 |
| 2013/0016124 A1 | 1/2013 | Han et al. | |
| 2015/0046375 A1* | 2/2015 | Mandel | G06T 13/80 |
| | | | 706/11 |
| 2015/0123967 A1* | 5/2015 | Quinn | G06T 7/75 |
| | | | 345/420 |
| 2015/0371447 A1* | 12/2015 | Yasutake | G06T 19/006 |
| | | | 345/420 |
| 2018/0122140 A1* | 5/2018 | Janzer | G06T 15/40 |
| 2018/0336715 A1 | 11/2018 | Rickwald et al. | |

FOREIGN PATENT DOCUMENTS

| | | |
|---|---|---|
| CN | 103942822 A | 7/2014 |
| WO | 2016154800 A1 | 10/2016 |

OTHER PUBLICATIONS

The European Patent Office (EPO) The Extended European Search Report for 19751218.9 dated Oct. 21, 2021 10 Pages.

* cited by examiner

EXPRESSION ANIMATION DATA PROCESSING METHOD, COMPUTER DEVICE, AND STORAGE MEDIUM

RELATED APPLICATIONS

This application is a continuation application of PCT Patent Application No. PCT/CN2019/071336, filed on Jan. 11, 2019, which claims priority to Chinese Patent Application No. 201810136285X, filed with the Chinese Patent Office on Feb. 9, 2018 and entitled "EXPRESSION ANIMATION DATA PROCESSING METHOD AND APPARATUS, COMPUTER DEVICE, AND STORAGE MEDIUM", content of all of which is incorporated herein by reference in its entirety.

FIELD OF THE TECHNOLOGY

This application relates to the field of computer technologies and, in particular, to an expression animation data processing method, a computer-readable storage medium, and a computer device.

BACKGROUND OF THE DISCLOSURE

With the development of computer technologies, an avatar modeling technology emerges. When a user records a video, an avatar model may form a synchronous corresponding expression according to an expression of a subject in a video picture.

However, in a current conventional method, all expression data needed by the avatar model needs to be loaded into the avatar model. Because much unnecessary expression data is loaded, heavy workload is often caused in expression data calculation for an animated avatar, and loading of excessive expression data leads to inefficiency and so on. The disclosed methods and systems are directed to solve one or more problems set forth above and other problems.

SUMMARY

According to embodiments provided in the present disclosure, an expression animation data processing method, a computer-readable storage medium, and a computer device are provided.

One aspect of the present disclosure includes an expression animation data processing method for a computer device. The method includes determining a location of a human face in an image and obtaining an avatar model; obtaining current expression data according to the location of the human face in the image and a three-dimensional face model; and obtaining expression change data from the current expression data. The method also includes determining a target split-expression-area that matches the expression change data, the target split-expression-area being selected from split-expression-areas corresponding to the avatar model; and obtaining target basic-avatar-data that matches the target split-expression-area. The method also includes combining the target basic-avatar-data according to the expression change data to generate to-be-loaded expression data; and loading the to-be-loaded expression data into the target split-expression-area to update an expression of an animated avatar corresponding to the avatar model.

Another aspect of the present disclosure includes a computer device. The computer device includes a memory storing computer-readable instructions; and a processor coupled to the memory. When executing the computer-readable instructions, the processor is configured to perform: determining a location of a human face in an image, and obtaining an avatar model; obtaining current expression data according to the location of the human face in the image and a three-dimensional face model; obtaining expression change data from the current expression data; determining a target split-expression-area that matches the expression change data, the target split-expression-area being selected from split-expression-areas corresponding to the avatar model; obtaining target basic-avatar-data that matches the target split-expression-area, and combining the target basic-avatar-data according to the expression change data to generate to-be-loaded expression data; and loading the to-be-loaded expression data into the target split-expression-area to update an expression of an animated avatar corresponding to the avatar model.

Other aspects of the present disclosure can be understood by those skilled in the art in light of the description, the claims, and the drawings of the present disclosure.

BRIEF DESCRIPTION OF THE DRAWINGS

To describe technical solutions of embodiments of the present disclosure more clearly, accompanying drawings for illustrating the embodiments are described briefly in the following. Apparently, the drawings in the following description are only some embodiments of the present disclosure, and a person of ordinary skill may derive other drawings based on these accompanying drawings without creative efforts.

DETAILED DESCRIPTION

To make objectives, technical solutions, and advantages of the present disclosure clearer and more comprehensible, the following further describes the present disclosure in detail with reference to the accompanying drawings. It is to be understood that the specific embodiments described herein are merely used for explaining the present disclosure but are not intended to limit the present disclosure.

Figure 1:
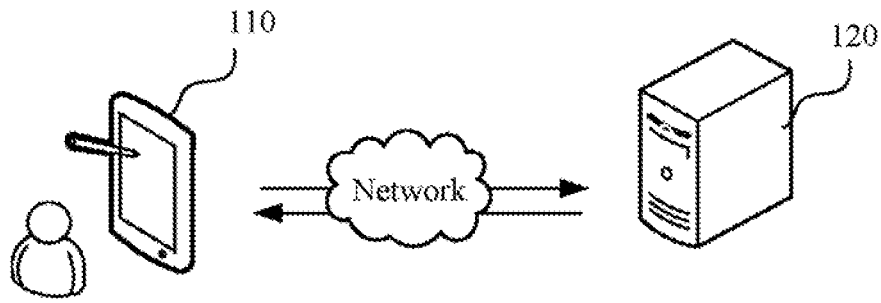
FIG. 1 is a diagram of an application environment of an expression animation data processing method according to an embodiment of the present disclosure.

FIG. 1 is a diagram of an application environment of an expression animation data processing method according to an embodiment. Referring to FIG. 1, the expression animation data processing method is applied to an expression animation data processing system. The expression animation data processing system includes a terminal 110 and a server 120. After collecting the face of a subject by using a photographing apparatus or other image collection apparatus, the terminal 110 determines a location of the human face in an image, and obtains an avatar model. Then, the terminal obtains, according to a three-dimensional face model in the terminal, current expression data of the subject collected by the photographing apparatus, obtains expression change data from the current expression data, and determines a matched target split-expression-area according to the expression change data. Further, the terminal obtains target basic-avatar-data that matches the target split-expression-area, generates to-be-loaded expression data according to the target basic-avatar-data, and loads the to-be-loaded expression data into the target split-expression-area to update the expression of an animated avatar corresponding to the avatar model.

After collecting the face of the subject by using the photographing apparatus, the terminal 110 may send the collected image of the subject to the server 120. The server obtains current expression data of the subject in the image according to a built-in three-dimensional face model, and obtains expression change data from the current expression data. The server determines a matched target split-expression-area according to the expression change data. The server further obtains target basic-avatar-data that matches the target split-expression-area, generates to-be-loaded expression data according to the target basic-avatar-data, and sends the to-be-loaded expression data to the terminal. The terminal may further load the to-be-loaded expression data into the target split-expression-area to update an expression of an animated avatar corresponding to the avatar model. The terminal 110 and the server 120 are connected by using a network. The terminal 110 may be specifically a desktop terminal or a mobile terminal. The mobile terminal may be specifically at least one of a mobile phone, a tablet computer, a notebook computer, and the like. The server 120 may be implemented by using a separate server or a server cluster that includes a plurality of servers.

Figure 2:
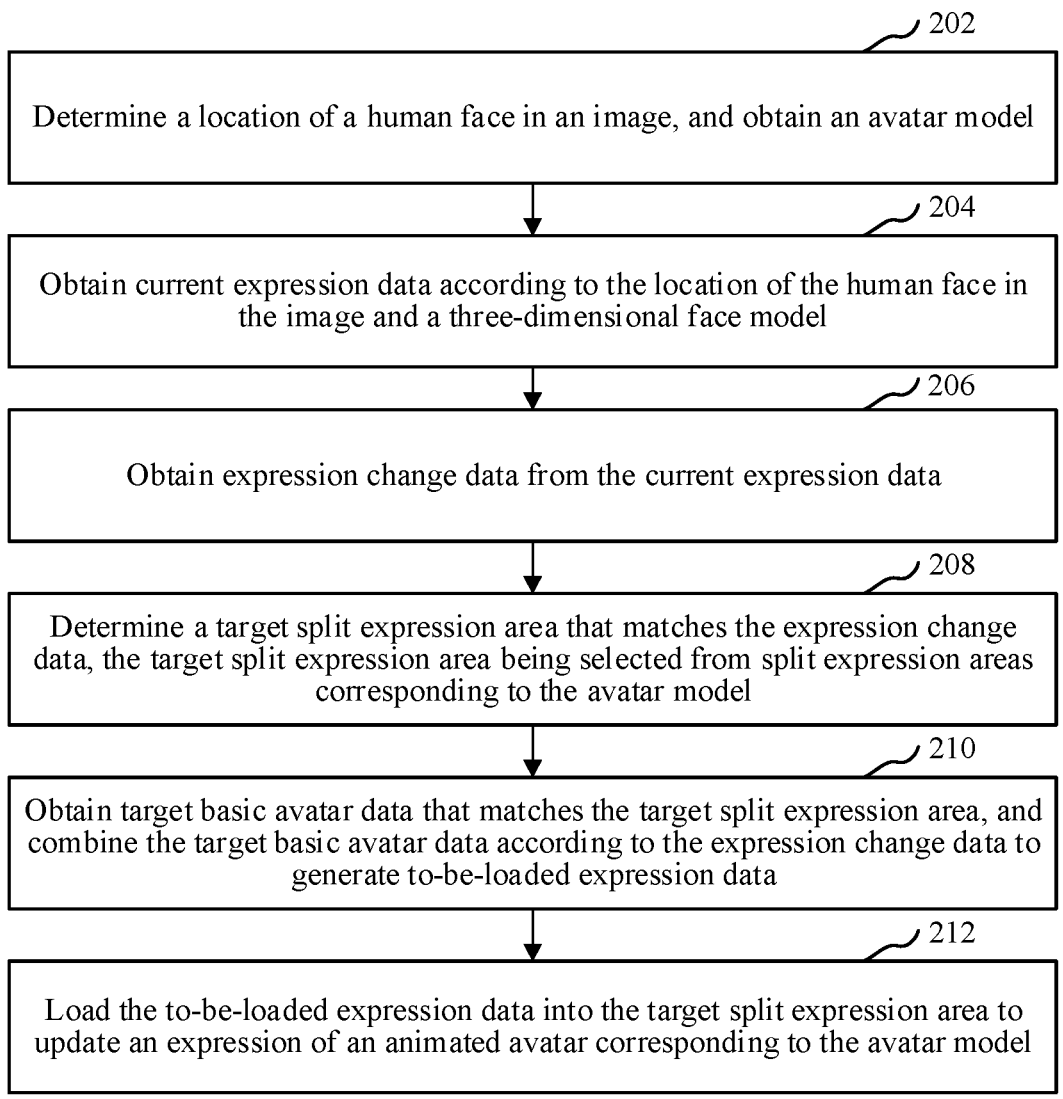
FIG. 2 is a schematic flowchart of an expression animation data processing method according to an embodiment of the present disclosure.

As shown in FIG. 2, in an embodiment, an expression animation data processing method is provided. This embodiment is mainly described by using an example in which the method is applied to the terminal 110 or the server 120 in FIG. 1. Referring to FIG. 2, the expression animation data processing method specifically includes the followings.

Step 202. Determine a location of a human face in an image, and obtain an avatar model.

The image herein includes a picture, a photo, a video, or the like, which may be a photo photographed by a camera of a terminal, a screenshot of the terminal, an image uploaded by using an application capable of uploading the image, or the like. The terminal herein includes any personal computer, notebook computer, personal digital assistant, smartphone, tablet computer, portable wearable device, or the like having an image processing function. The avatar model is a model for displaying an animated avatar. The animated avatar is an animated avatar designed by using design software. For example, the animated avatar may be an avatar of a little dog, an avatar of a little cat, or an avatar of a mouse.

Specifically, the terminal determines a specific location of a human face in the photo photographed by the camera of the terminal, the screenshot of the terminal, or the image uploaded by using the application capable of uploading the image, and then obtains an avatar model for displaying an animated avatar. Alternatively, the terminal sends, to a server, the photo photographed by the camera, the screenshot of the terminal, or the image uploaded by using the application capable of uploading the image, and the server determines a specific location of a human face in the image, and further obtains an avatar model for displaying an animated avatar.

Step 204. Obtain current expression data according to the location of the human face in the image and a three-dimensional face model.

The three-dimensional face model is a model for obtaining current facial expression data of a subject collected by a photographing apparatus of the terminal. The current expression data is expression data of a current facial expression change of the subject collected by the photographing apparatus of the terminal. Because the face of the subject is the most important and direct carrier of emotional transmission of the subject, a facial expression of the subject may be learned from the face of the subject, a facial feature point may be extracted from the face of the subject in the image collected by the photographing apparatus, and a three-dimensional face model of the subject may be established according to the extracted facial feature point. For example, the three-dimensional face model specifically may be a three-dimensional human face model, a three-dimensional animal face model, or the like.

Specifically, after the specific location of the human face in the photo photographed by the camera of the terminal, the screenshot of the terminal, or the image uploaded by using the application capable of uploading the image is determined, a facial feature point is extracted from the human face at the specific location of the image, a three-dimensional face model of the subject is established according to the extracted facial feature point, then face data of the current subject is obtained from the three-dimensional face model, and current expression data corresponding to the current subject is obtained according to the face data. For example, a facial feature point is extracted from face data in the three-dimensional face model, and current expression data is obtained according to the facial feature point. The current expression data may be expression data corresponding to an eye, expression data corresponding to a mouth, expression data corresponding to a nose, and the like.

Step 206. Obtain expression change data from the current expression data.

The expression change data herein is expression data of an expression change of the face of the subject. The expression change data may be expression data of a change relative to a facial expression of the subject in a historical image frame. For example, a facial expression of the subject in a previous image frame is expressionless. The "expressionless" means that a feature point of the facial expression does not change. When a facial expression of the subject in a current image frame is smile, it indicates that a feature point of the mouth of the subject in the current image frame changes. Therefore, expression data corresponding to the mouth may be used as expression change data.

Specifically, after the facial expression data of the current subject is obtained according to the three-dimensional face model, the facial expression data of the current subject in the three-dimensional face model may be compared with facial expression data in the three-dimensional face model corresponding to the face of the subject in a historical image frame, to obtain expression change data of the current subject. In an embodiment, the expression change data of the current subject may be obtained by directly comparing feature points corresponding to facial expression data.

Step 208. Determine a target split-expression-area that matches the expression change data, the target split-expression-area being selected from split-expression-areas corresponding to the avatar model.

A split-expression-area is an expression area in the avatar model, in which an expression motion change is made so that an expression corresponding to the expression change data is generated. For example, when the expression change data is laugh, because laugh is generated by an expression motion change of a mouth, the mouth in the avatar model is a target split-expression-area that matches the expression change data "laugh". The avatar model may be a face model of the animated avatar. The avatar model may be split into a plurality of split-expression-areas according to a specific rule. For example, the split-expression-areas may be two ears, two eyes, the mouth, and the like of the animated avatar.

Specifically, after the expression change data is obtained according to the expression motion change of the face of the corresponding current subject in the three-dimensional face model, a target split-expression-area that matches the expression change data is determined from the plurality of split-expression-areas of the avatar model according to the expression change data.

Step 210. Obtain target basic-avatar-data that matches the target split-expression-area, and combine the target basic-avatar-data according to the expression change data to generate to-be-loaded expression data.

Basic-avatar-data is a set of animated avatar expression data of basic expressions corresponding to the split-expression-areas forming the avatar model. For example, the basic-avatar-data may be mouth expression data of a mouth expression corresponding to a split-expression-area that is a mouth, eye expression data of an eye expression corresponding to a split-expression-area that is an eye, and the like. Because the target split-expression-area is obtained from the plurality of split-expression-area of the avatar model through matching according to the expression change data, the target basic-avatar-data is basic-avatar-data obtained from the basic-avatar-data through matching according to the target split-expression-area. The target basic-avatar-data is basic-avatar-data corresponding to the target split-expression-area. Because there are a plurality of expression changes in the target split-expression-area, and the expression changes have corresponding expression-change-coefficients, the target basic-avatar-data may be combined according to the expression change data and an expression-change-coefficient corresponding to the expression change data to generate to-be-loaded expression data. The to-be-loaded expression data is directly loaded into the split-expression-area to control a change of an expression of the animated avatar corresponding to the avatar model, which is expression data corresponding to the expression in the three-dimensional face model. For example, the to-be-loaded expression data may be smile, laugh, eye opening, and the like.

Step 212. Load the to-be-loaded expression data into the target split-expression-area to update an expression of an animated avatar corresponding to the avatar model.

The avatar model is a model for displaying the animated avatar. The animated avatar is an animated avatar designed by using design software. For example, the animated avatar may be an avatar of a little dog, an avatar of a little cat, or an avatar of a mouse. The to-be-loaded expression data is generated through combination according to the expression change data and the corresponding expression-change-coefficient. Therefore, the generated to-be-loaded expression data is loaded into the target split-expression-area of the avatar model, so that the animated avatar in the avatar model can make the expression change corresponding to the current expression of the three-dimensional face model. That is, the animated avatar in the avatar model can generate the same expression as the subject in the image collected by the photographing apparatus. For example, the expression of the subject in the image collected by the photographing apparatus is laugh, and therefore, the mouth of the animated avatar in the avatar model also make the expression of laugh. The mouth is a target split-expression-area corresponding to the loaded expression of laugh in the avatar model.

In one embodiment, the current expression data of the subject is obtained according to the three-dimensional face model, the expression change data of the subject is obtained from the current expression data, the matched target split-expression-area is obtained from the split-expression-areas of the avatar model according to the expression change data, the target basic-avatar-data that matches the target split-expression-area is further obtained to generate the to-be-loaded expression data, and finally the to-be-loaded expression data is loaded into the target split-expression-area to update the expression of the animated avatar corresponding to the avatar model. Therefore, during expression loading of the avatar model, only expression data corresponding to an expression update is loaded, which reduces workload in calculation for the animated avatar, and improve efficiency of updating the expression of the animated avatar.

In an embodiment, the process of obtaining an avatar model includes: extracting a human face feature point from the human face in the image, and obtaining a corresponding avatar model according to the human face feature point; or obtaining an avatar model set, the avatar model set including a plurality of avatar models, obtaining an avatar model selection instruction, and obtaining a target avatar model from the avatar model set according to the avatar model selection instruction.

In one embodiment, to implement a more vivid animated avatar, an avatar model for displaying a personalized animated avatar needs to be obtained first. The avatar model may be dynamically allocated by using the feature point of the human face in the image. Alternatively, a matched avatar model, that is, the target avatar model, is selected from the avatar model set according to a requirement, a preference, or the like of a user of the terminal. For example, a manner of obtaining an avatar model for displaying an animated avatar is a manner of dynamically allocating an avatar model by the server or the terminal. Specifically, after the photo photographed by the camera of the terminal, the screenshot of the terminal, or the image uploaded by using the application capable of uploading the image is obtained, a feature point is extracted from the face of a character in the image. Because different characters have different facial features, human face feature points extracted from faces of different characters in different images are different. Further, corresponding avatar models are obtained according to human face feature points of the faces of the different characters, to display animated avatars by using the obtained avatar models.

In another manner, a matched avatar model may be autonomously selected from an avatar model set according to a requirement or a preference of a user. Specifically, an avatar model obtaining instruction is an instruction for selecting an avatar model. The avatar model set may be obtained by using a related application of the terminal for the user of the terminal to select, and then the matched avatar model may be selected from the avatar model set by using a control in the related application, to display an animated avatar by using the selected avatar model.

Figure 3:
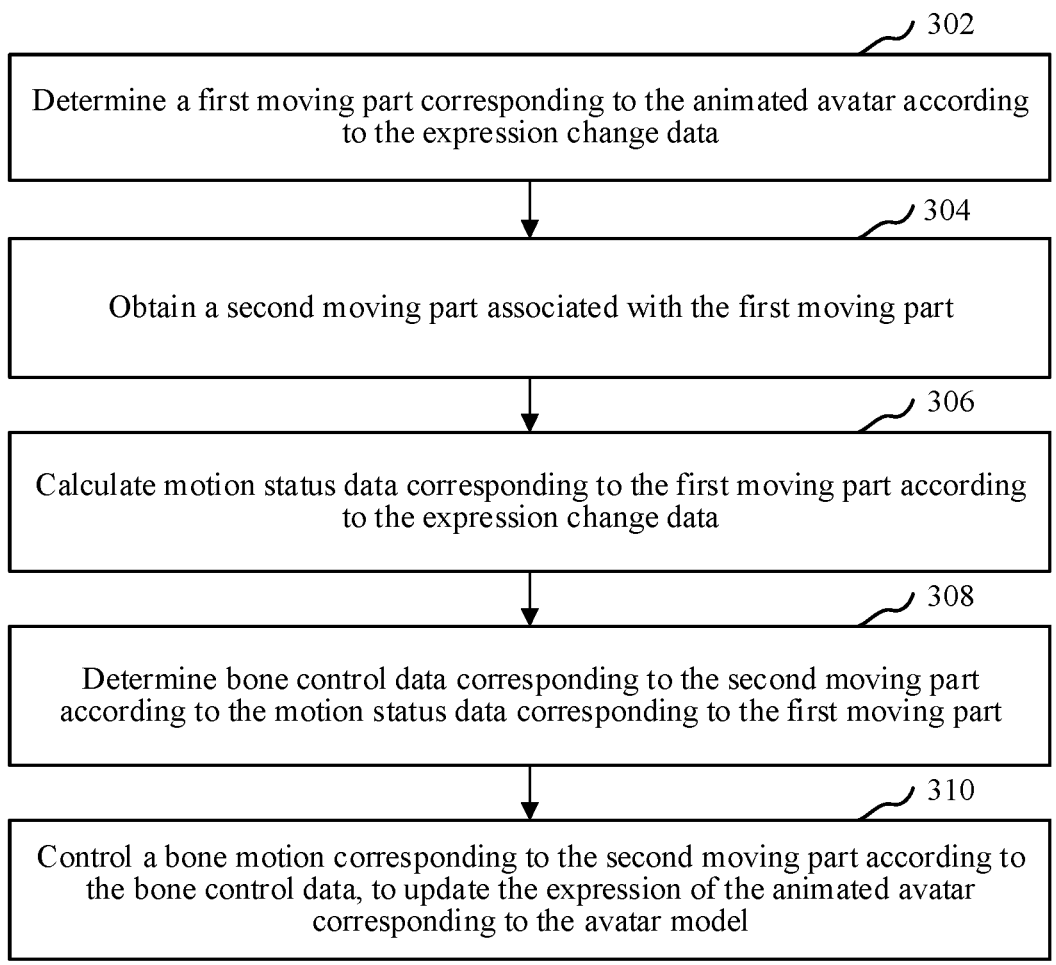
FIG. 3 is a schematic flowchart of an expression animation data processing method according to another embodiment of the present disclosure.

In another embodiment, as shown in FIG. 3, based on FIG. 2, the expression animation data processing method further includes the following steps:

Step 302. Determine a first moving part corresponding to the animated avatar according to the expression change data.

Figure 4:
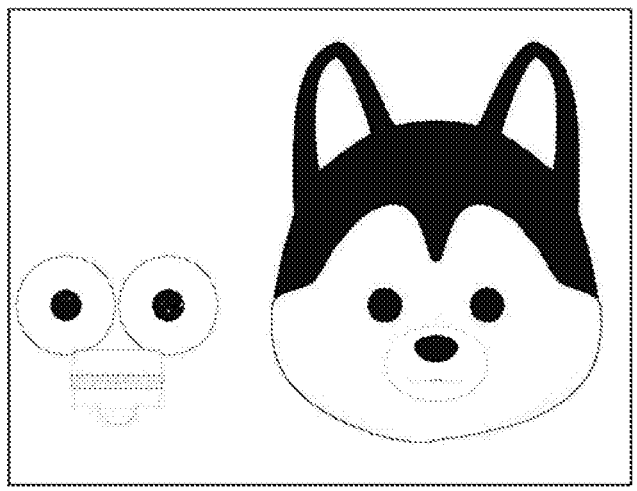
FIG. 4 is a schematic diagram of a moving part of an animated avatar according to an embodiment of the present disclosure.

The first moving part is a part associated with a second moving part, which may control a bone corresponding to the second moving part to move correspondingly. For example, the first moving part may be a moving part that controls an obvious expression portion in the avatar model. The obvious expression portion is opposite to a subtle expression portion. An expression change of the obvious expression portion causes an expression change of the subtle expression portion. The obvious expression portion may be the face of the animated avatar corresponding to the avatar model, for example, an eye affecting a motion of an eyeball, a mouth affecting a motion of teeth, or a head affecting a motion of ears. The subtle expression portion may be affected by the obvious expression portion and change, which includes eyeballs, teeth, ears, and the like of the animated avatar. Because the expression change data is expression data obtained according to the expression change of the face of the current subject displayed by the three-dimensional face model, a part of the animated avatar that makes the expression change corresponding to the expression change data may be determined as the first moving part according to the expression change data. FIG. 4 is a schematic diagram of a moving part of an animated avatar according to an embodiment. The face of the animated avatar may be an obvious expression portion, that is, the first moving part, in the avatar model. For example, if the expression change data obtained according to the expression change of the face of the current subject in the three-dimensional face model is laugh and eye opening, according to the expression change data "laugh and eye opening", it may be determined that first moving parts corresponding to "laugh and eye opening" in the animated avatar are a mouth and an eye respectively.

Step 304. Obtain a second moving part associated with the first moving part.

The second moving part herein is a part associated with the first moving part and affected by the first moving part. For example, the second moving part is a moving part that controls a subtle expression portion in the avatar model. As shown in FIG. 4, eyeballs, teeth, ears, and the like of the animated avatar in FIG. 4 may be second moving parts. For example, the first moving part is the face of the animated avatar, and therefore, a second moving part associated with the face may be eyeballs, ears, a jaw, or the like. Specifically, if the first moving part is an eye of the animated avatar in the avatar model, the second moving part associated with the first moving part "eye" is an eyeball. Similarly, if the first moving part is the mouth of the animated avatar in the avatar model, the second moving part associated with the first moving part "mouth" is a jaw.

Step 306. Calculate motion status data corresponding to the first moving part according to the expression change data.

Because the expression change data is expression data obtained according to the expression motion change of the face of the current subject in the three-dimensional face model, the first moving part in the avatar model that makes the expression motion change corresponding to the expression change data may be determined according to the expression change data. Moreover, the moving part may make different motion changes. Therefore, the motion status data corresponding to the first moving part may be calculated according to the expression change data. The motion status data is an amplitude change value of each motion change of the moving part or a change value of the motion change. For example, the motion status data may be an eye expression-change-coefficient or a mouth expression-change-coefficient.

Step 308. Determine bone control data corresponding to the second moving part according to the motion status data corresponding to the first moving part.

The bone control data is bone data for controlling a motion of the second moving part. For example, the bone control data may be an Euler angle. The Euler angle is an angle for determining rotation of the second moving part, which may also be referred to as a rotation angle. Specifically, because the second moving part is a moving part associated with the first moving part, the bone control data corresponding to the second moving part may be calculated according to the motion status data corresponding to the first moving part. For example, the first moving part is an eye, motion status data of the eye is an eye expression-change-coefficient corresponding to the eye, and the second moving part associated with the first moving part "eye" is an eyeball. Therefore, an Euler angle of a bone of the eyeball, that is, the bone control data corresponding to the second moving part, may be calculated according to the eye expression-change-coefficient.

Step 310. Control a bone motion corresponding to the second moving part according to the bone control data, to update the expression of the animated avatar corresponding to the avatar model.

Figure 5:
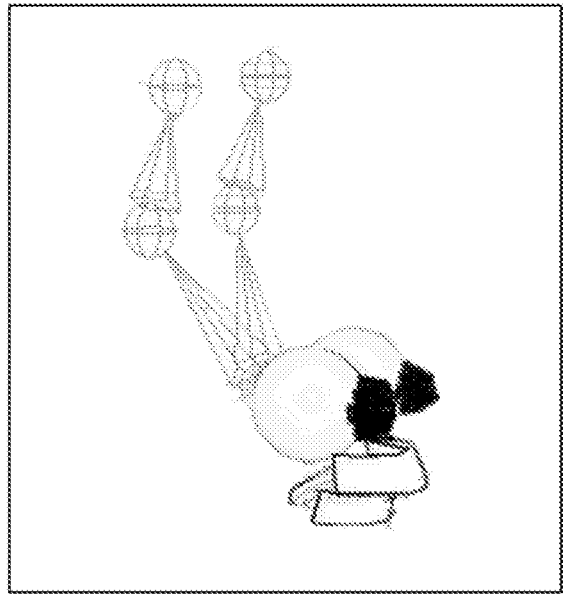
FIG. 5 is a schematic diagram of a bone for controlling a second moving part according to an embodiment of the present disclosure.

The bone control data is used for controlling the bone motion corresponding to the second moving part. For example, the bone motion may be rotating, turning, turning to left, turning to right, or the like. FIG. 5 is a schematic diagram of a bone for controlling a second moving part according to an embodiment. For example, a bone motion corresponding to an eye is controlled by using bone control data corresponding to the eyeball, a bone motion corresponding to a jaw is controlled by using bone control data of the jaw, or a bone motion corresponding to an ear is controlled by using bone control data of the ear.

Figure 6:
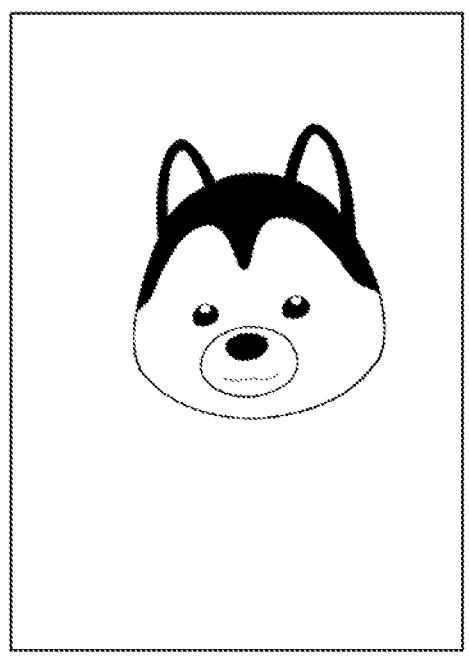
FIG. 6 is a schematic diagram of bending ears when a first moving part is a head and is turned according to an embodiment of the present disclosure.
Figure 7:
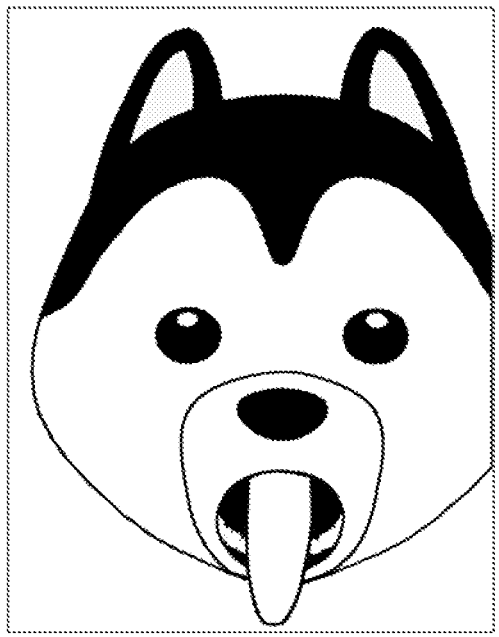
FIG. 7 is a schematic diagram of sticking out a tongue when a first moving part is a mouth and is opened according to an embodiment of the present disclosure.

Specifically, the bone motion corresponding to the second moving part is controlled according to the bone control data of the second moving part, so that the animated avatar in the avatar model can make the expression change corresponding to the current expression in the three-dimensional face model. For example, the bone control data is an Euler angle of the second moving part "eyeball", and a bone of the eyeball may be controlled according to the Euler angle to make a corresponding eyeball bone motion. FIG. 6 is a schematic diagram of bending ears when a first moving part is a head and is turned according to an embodiment. When the first moving part is a head and is turned, for the second moving part that is associated with the first moving part and is an ear, it is determined that a bone motion of the second moving part "ear" is bending inward by using a speed of the first moving part "head". Alternatively, FIG. 7 is a schematic diagram of sticking out a tongue when a first moving part is a mouth and is opened according to an embodiment. When the first moving part is a mouth opening and sticking out the tongue, for the second moving part that is associated with the first moving part and is a jaw, it is determined that a bone motion of the second moving part "jaw" is sticking out by using the expression change of the first moving part "mouth".

Figure 8:
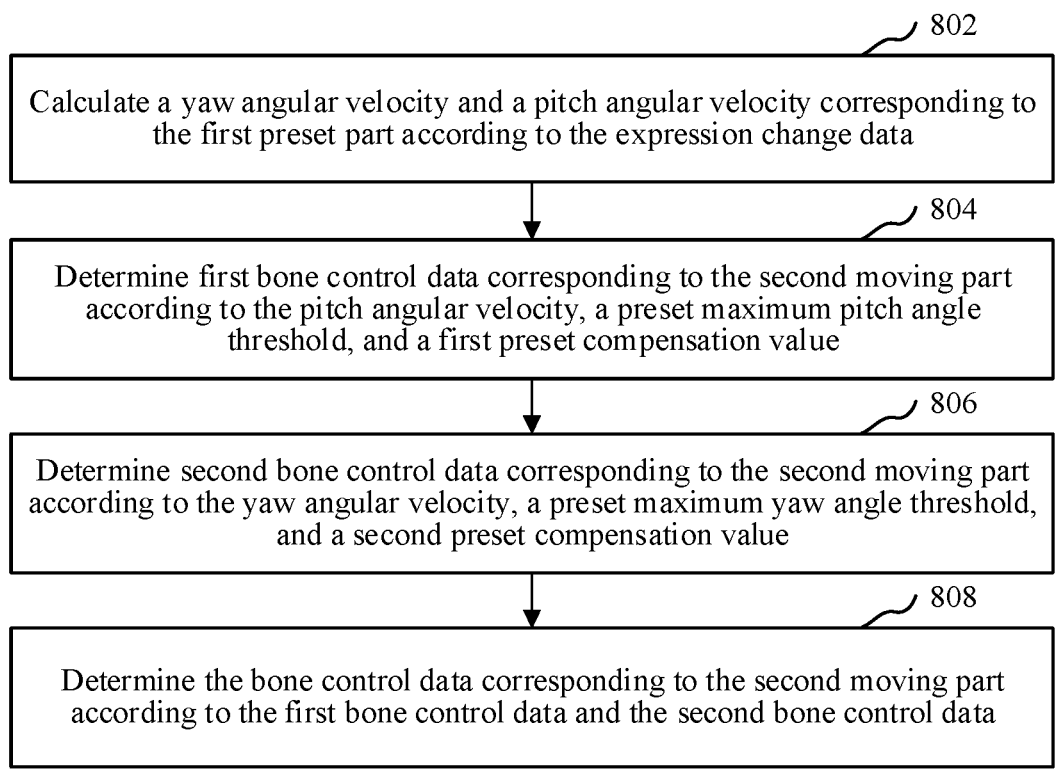
FIG. 8 is a schematic flowchart of determining bone control data according to an embodiment of the present disclosure.

In an embodiment, as shown in FIG. 8, in a case that the first moving part is a first preset part, the calculating motion status data corresponding to the first moving part according to the expression change data and the determining bone control data corresponding to the second moving part according to the motion status data corresponding to the first moving part include:

Step 802. Calculate a yaw angular velocity and a pitch angular velocity corresponding to the first preset part according to the expression change data.

The first preset part is a part in the animated avatar corresponding to the avatar model that makes an expression motion change according to the yaw angular velocity and the pitch angular velocity. The yaw angular velocity and the pitch angular velocity are components in an Euler angle. The yaw angular velocity is a rotation value of rotating round a Y axis of a coordinate system established by using a head as an origin. Similarly, the pitch angular velocity is a rotation value of rotating round an X axis of the coordinate system established by using the head as the origin. Specifically, the first preset part in the avatar model makes an expression motion change to generate an expression corresponding to the expression change data. Therefore, a coordinate system is established by using the first preset part as an origin, and a pitch angular velocity of rotating around an X axis by the first preset part and a yaw angular velocity of rotating around a Y axis by the first preset part are calculated according to the expression change data. For example, the first preset part may be a head, and a yaw angular velocity and a pitch angular velocity corresponding to the head may be calculated according to a rotation speed of the head.

Step 804. Determine first bone control data corresponding to the second moving part according to the pitch angular velocity, a preset maximum pitch angle threshold, and a first preset compensation value.

The preset maximum pitch angle threshold is a maximum angle threshold pre-delivered by a cloud server to control the first preset part to rotate around the X axis. Specifically, the first bone control data corresponding to the second moving part is calculated according to the pitch angular velocity of rotating around the X axis by the first preset part, the maximum angle threshold pre-delivered by the cloud server to control the first preset part to rotate around the X axis, and the first preset compensation value. The first bone control data is used for controlling one of rotation angles of the bone motion corresponding to the second moving part. The first bone control data may be a nutation angle in the Euler angle.

Step 806. Determine second bone control data corresponding to the second moving part according to the yaw angular velocity, a preset maximum yaw angle threshold, and a second preset compensation value.

Similarly, the preset maximum yaw angle threshold is a maximum angle threshold pre-delivered by the cloud server to the terminal to control the first preset part to rotate around the Y axis. Specifically, the second bone control data corresponding to the second moving part is calculated according to the yaw angular velocity of rotating around the Y axis by the first preset part, the maximum angle threshold pre-delivered by the cloud server to control the first preset part to rotate around the Y axis, and the second preset compensation value. The second bone control data is used for controlling one of the rotation angles of the bone motion corresponding to the second moving part. The second bone control data may be a precession angle in the Euler angle.

Step 808. Determine the bone control data corresponding to the second moving part according to the first bone control data and the second bone control data.

Because the first bone control data and the second bone control data each are used for controlling one of the rotation angles of the bone motion corresponding to the second moving part, the bone control data corresponding to the second moving part may be calculated according to the calculated first bone control data and second bone control data. For example, if the first bone control data is a nutation angle and the second bone control data is a precession angle, the Euler angle for controlling rotation of the second moving part may be calculated according to the nutation angle and the precession angle. For example, $\text{Ear}_{eulerAngles}=(H_p \times V_p + A, H_y \times V_y + B, 0)$, $\text{Ear}_{eulerAngles}$ is the bone control data "Euler angle" of the second moving part "ear", $V_p$ and $V_y$ are respectively the pitch angular velocity and the yaw angular velocity of the first moving part "head", A and B are compensation values required in calculation, and $H_p$ and $H_y$ are thresholds controlled by the cloud server.

Figure 9:
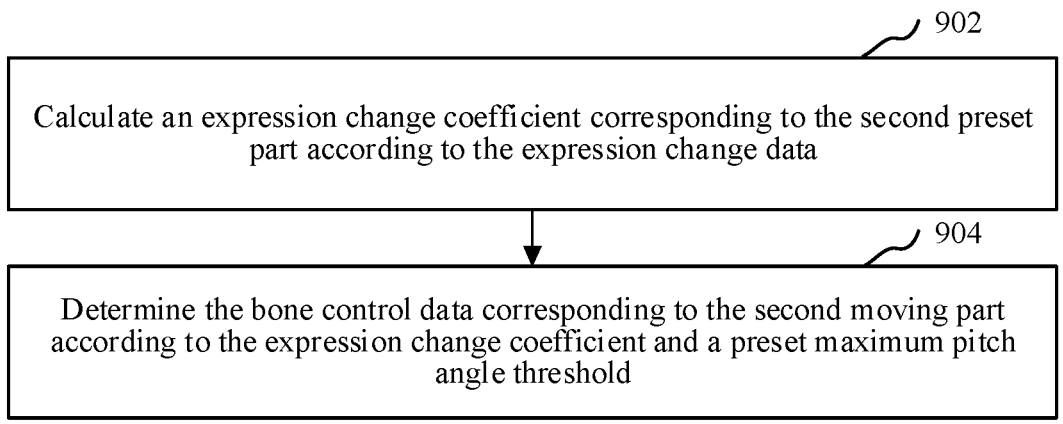
FIG. 9 is a schematic flowchart of determining bone control data according to another embodiment of the present disclosure.

In an embodiment, as shown in FIG. 9, in a case that the first moving part is a second preset part, the calculating motion status data corresponding to the first moving part according to the expression change data and the determining bone control data corresponding to the second moving part according to the motion status data corresponding to the first moving part include:

Step 902. Calculate an expression-change-coefficient corresponding to the second preset part according to the expression change data.

The second preset part is a part in the animated avatar corresponding to the avatar model that makes an expression motion change to generate the same expression as the expression change data. For example, the second preset part may be a mouth. Specifically, the expression-change-coefficient corresponding to the second preset part may be calculated according to a change value of an expression motion change in the expression change data or an expression weight-coefficient corresponding to the expression motion change. The expression-change-coefficient may change with an opening amplitude. For example, if the expression change data is laugh, an opening amplitude of the second preset part "mouth" is greater than an opening amplitude corresponding to smile. Therefore, the opening amplitude of the mouth is an expression-change-coefficient corresponding to the mouth.

Step 904. Determine the bone control data corresponding to the second moving part according to the expression-change-coefficient and a preset maximum pitch angle threshold.

Similarly, the preset maximum pitch angle threshold is a maximum angle threshold pre-delivered by a cloud server to control the second preset part to rotate around an X axis. The expression-change-coefficient is a change value of a motion change of the second preset part. For example, when the second preset part is a mouth, the expression-change-coefficient may be an opening amplitude of the mouth. Specifically, the bone control data corresponding to the second moving part, that is, an Euler angle of the second moving part, is calculated according to the change value of the motion change of the second preset part and the maximum angle threshold pre-delivered by the cloud server to control the second preset part to rotate around the X axis. For example, $\text{Jaw}_{eulerAngles}=(H_p \times A_{openMouth}, 0, 0)$, $\text{Jaw}_{eulerAngles}$ is the bone control data "Euler angle" of the second moving part "jaw", $H_p$ is the maximum pitch angle threshold controlled by the cloud server, and $A_{openMouth}$ is the expression-change-coefficient of the first moving part "mouth", which is a mouth opening expression coefficient.

Figure 10:
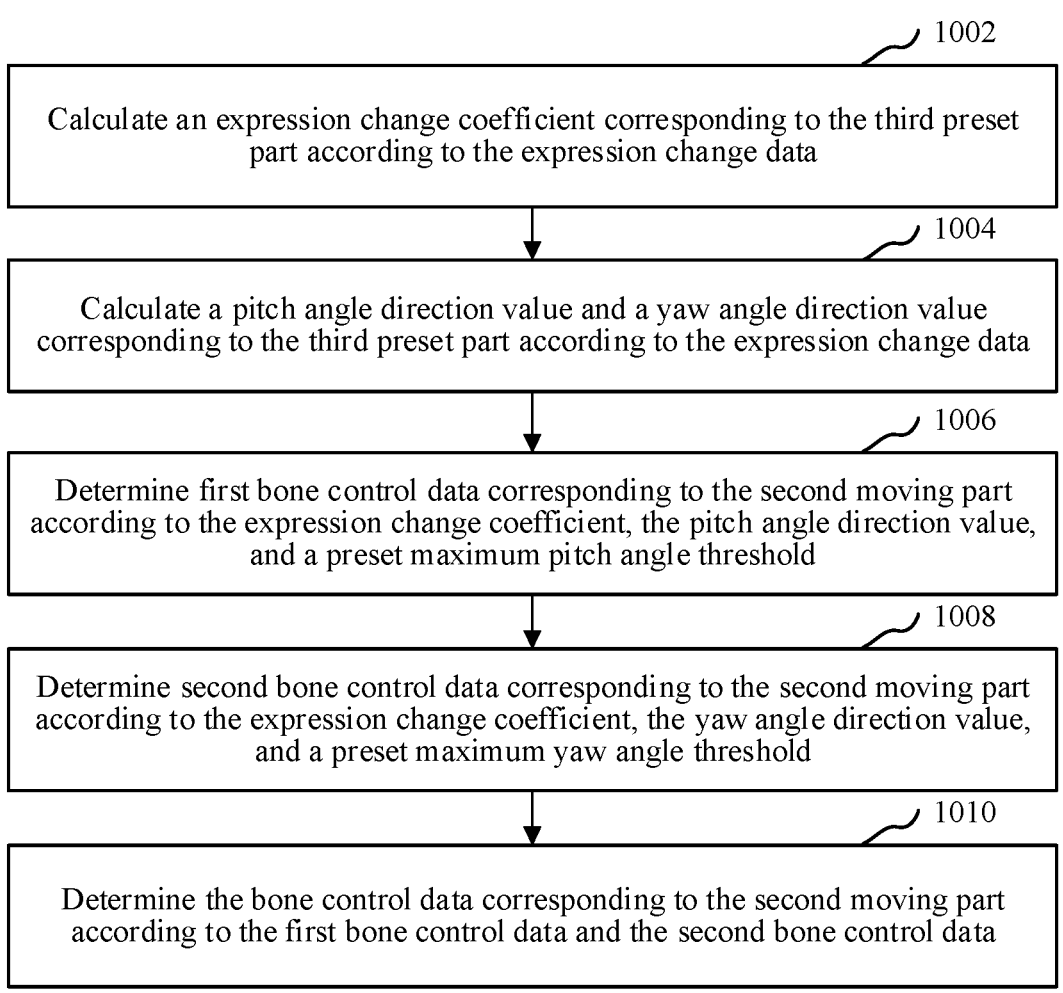
FIG. 10 is a schematic flowchart of determining bone control data according to still another embodiment of the present disclosure.

In an embodiment, as shown in FIG. 10, in a case that the first moving part is a third preset part, the calculating motion status data corresponding to the first moving part according to the expression change data and the determining bone control data corresponding to the second moving part according to the motion status data corresponding to the first moving part include:

Step 1002. Calculate an expression-change-coefficient corresponding to the third preset part according to the expression change data.

The third preset part is a part in the animated avatar corresponding to the avatar model that makes an expression motion change according to the expression change data. The third preset part may be an eye. An eye expression-change-coefficient is calculated according to an eye expression change. Eye expression change data is the expression change data. The eye expression change includes opening the eye, closing the eye, looking left, looking right, looking upward, looking downward, or the like. Therefore, the eye expression-change-coefficient is an expression change weight-coefficient corresponding to each eye expression change. Specifically, an expression change weight-coefficient corresponding to the third preset part is calculated according to the expression change data of the third preset part. For example, if the third preset part is an eye, and the eye expression change is looking right, a weight-coefficient corresponding to the eye expression change "looking right" is the expression-change-coefficient corresponding to the eye.

Step 1004. Calculate a pitch angle direction value and a yaw angle direction value corresponding to the third preset part according to the expression change data.

A pitch angle is a rotation value of rotating around an X axis of a coordinate system established by using the third preset part as an origin. Therefore, the pitch angle direction value is a direction value of rotating around the X axis direction by the third preset part. Similarly, a yaw angle is a rotation value of rotating around a Y axis of the coordinate system established by using the third preset part as the origin. Therefore, the yaw angle direction value is a direction value of rotating around the Y axis direction by the third preset part. Specifically, the pitch angle direction value and the yaw angle direction value corresponding to the third preset part are obtained according to the expression change data corresponding to the third preset part. For example, if a pitch angle direction is a positive direction, and the pitch angle direction value corresponding to the positive direction is 1, a yaw angle direction is a negative direction, and the yaw angle direction value corresponding to the direction is −1.

Step 1006. Determine first bone control data corresponding to the second moving part according to the expression-change-coefficient, the pitch angle direction value, and a preset maximum pitch angle threshold.

The expression-change-coefficient herein is an expression weight-coefficient corresponding to an expression change of the third preset part. For example, the third preset part may be an eye, and the expression change data is eye opening. Therefore, an expression-change-coefficient corresponding to the eye is an expression weight-coefficient corresponding to "eye opening". Specifically, the first bone control data corresponding to the second moving part is calculated according to the expression weight-coefficient corresponding to the expression change of the third preset part, the pitch angle direction value, and the maximum angle threshold pre-delivered by a cloud server to control the third preset part to rotate around the X axis. The first bone control data is used for controlling one of rotation angles of the bone motion corresponding to the second moving part. The first bone control data may be a nutation angle in an Euler angle.

Step 1008. Determine second bone control data corresponding to the second moving part according to the expression-change-coefficient, the yaw angle direction value, and a preset maximum yaw angle threshold.

Specifically, the second bone control data corresponding to the second moving part is calculated according to the expression weight-coefficient corresponding to the expression change of the third preset part, the yaw angle direction value, and the maximum angle threshold pre-delivered by the cloud server to control the third preset part to rotate around the Y axis. The second bone control data is used for controlling one of the rotation angles of the bone motion corresponding to the second moving part. The second bone control data may be a precession angle in the Euler angle.

Step 1010. Determine the bone control data corresponding to the second moving part according to the first bone control data and the second bone control data.

Similarly, because the first bone control data and the second bone control data corresponding to the second moving part each are used for controlling one of the rotation angles of the bone motion corresponding to the second moving part, the bone control data corresponding to the second moving part may be calculated according to the first bone control data and the second bone control data. For example, if the first bone control data is a nutation angle and a second bone control data is the precession angle, an Euler angle for controlling rotation of the second moving part may be calculated according to the nutation angle and the precession angle. For example, $Eye_{eulerAngles} = (S_p \times H_p \times A_{eye}, S_y \times H_y \times A_{eye}, 0)$, $Eye_{eulerAngles}$ is an Euler angle of a bone of the second moving part "eyeball", $S_p$ and $S_y$ are direction values for rotation calculation, $H_p$ and $H_y$ are the maximum pitch angle and yaw angle thresholds controlled by the cloud server, and $A_{eye}$ is the expression-change-coefficient of the first moving part "eye", which is an eye expression-change-coefficient.

Figure 11:
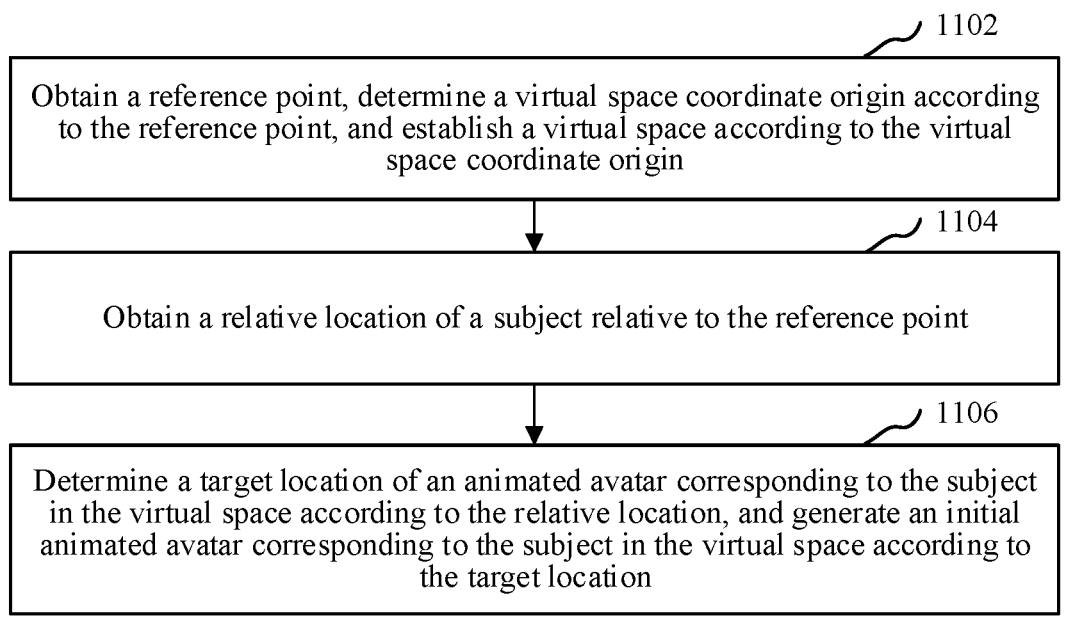
FIG. 11 is a schematic flowchart of an expression animation data processing method according to still another embodiment of the present disclosure.

In an embodiment, as shown in FIG. 11, based on FIG. 2, the expression animation data processing method further includes the followings.

Step 1102. Obtain a reference point, determine a virtual space coordinate origin according to the reference point, and establish a virtual space according to the virtual space coordinate origin.

Step 1104. Obtain a relative location of a subject relative to the reference point.

Step 1106. Determine a target location of an animated avatar corresponding to the subject in the virtual space according to the relative location, and generate an initial animated avatar corresponding to the subject in the virtual space according to the target location.

Figure 12:
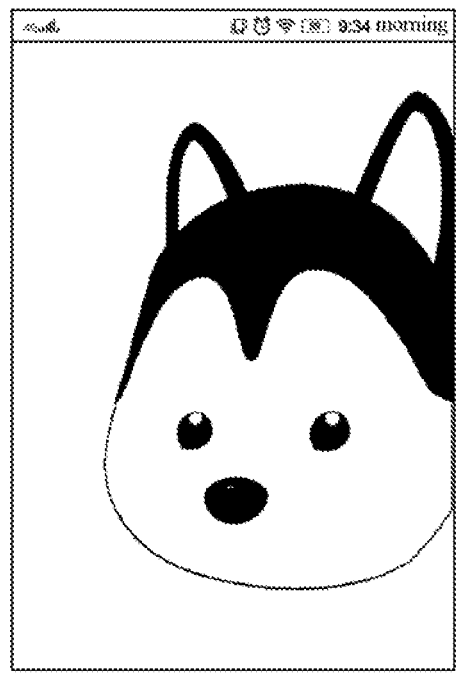
FIG. 12 is a schematic screen shot of displaying an animated avatar on a terminal according to an embodiment of the present disclosure.

The reference point herein is an origin that is set during measurement. For example, the reference point may be using the terminal as a reference point. Specifically, the reference point is obtained, the reference point is used as a virtual space coordinate origin, a virtual space is established according to the determined virtual space coordinate origin, and a relative location, relative to the reference point, of the subject in the image collected by the photographing apparatus is obtained. The relative location is a location of the subject relative to the reference point. Further, a location of the animated avatar corresponding to the subject in the virtual space, that is, the target location of the animated avatar in the virtual space, may be determined according to the obtained location of the subject relative to the reference point. Further, an initial avatar corresponding to the subject may be obtained according to the target location of the animated avatar in the virtual space, and displayed at the target location of the virtual space. FIG. 12 is a schematic diagram of displaying an animated avatar on a terminal. The initial avatar is an initial appearance of the avatar.

Figure 13:
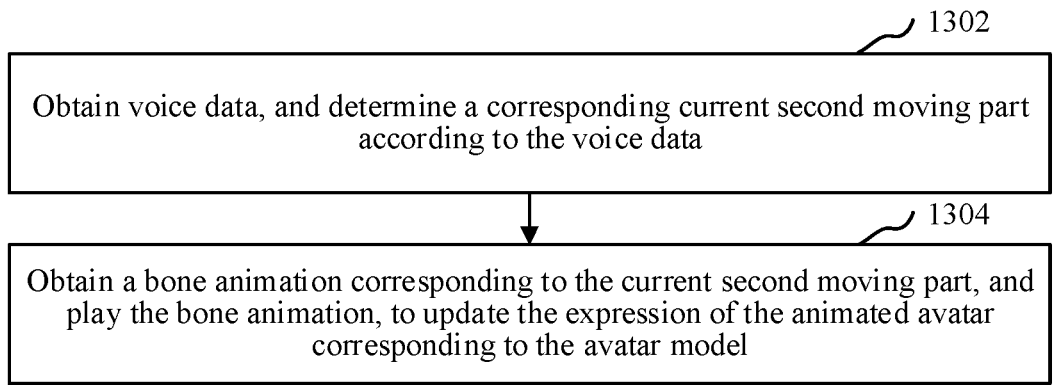
FIG. 13 is a schematic flowchart of an expression animation data processing method according to yet another embodiment of the present disclosure.

In an embodiment, as shown in FIG. 13, the expression animation data processing method further includes the followings.

Step 1302. Obtain voice data, and determine a corresponding current second moving part according to the voice data.

Step 1304. Obtain a bone animation corresponding to the current second moving part, and play the bone animation, to update the expression of the animated avatar corresponding to the avatar model.

The voice data is data collected by using a voice collection apparatus of the terminal. The voice data may be voice data collected by the voice collection apparatus in real time, voice data recorded by using related application software, or the like. A current moving part is a subtle expression portion that matches the voice data, that is, a second moving part. As described above, the second moving part may be eyeballs, ears, a jaw, or the like. Because a second moving part is preset for each piece of voice data, a matched subtle expression portion, that is, the current second moving part, may be determined according to the voice data obtained by the terminal.

Further, because a cloud server delivers a bone animation corresponding to each second moving part to the terminal, a corresponding bone animation may be obtained according to the determined current second moving part. The bone animation is a skeleton structure including "bones" interconnected with each other in the avatar model. An animation is generated for the avatar model by changing an orientation and a location of a bone. After the bone animation corresponding to the current second moving part is obtained, the obtained bone animation is played, so that the animated avatar in the avatar model can make an expression change corresponding to the voice data. For example, the voice data is "faint", and it is determined that current second moving parts corresponding to the voice data are ears and eyeballs. Therefore, an obtained bone animation corresponding to the ears and the eyeballs is simultaneous clockwise rotation. In this case, ears and eyeballs of the animation image in the avatar model simultaneously rotate clockwise.

Figure 14:
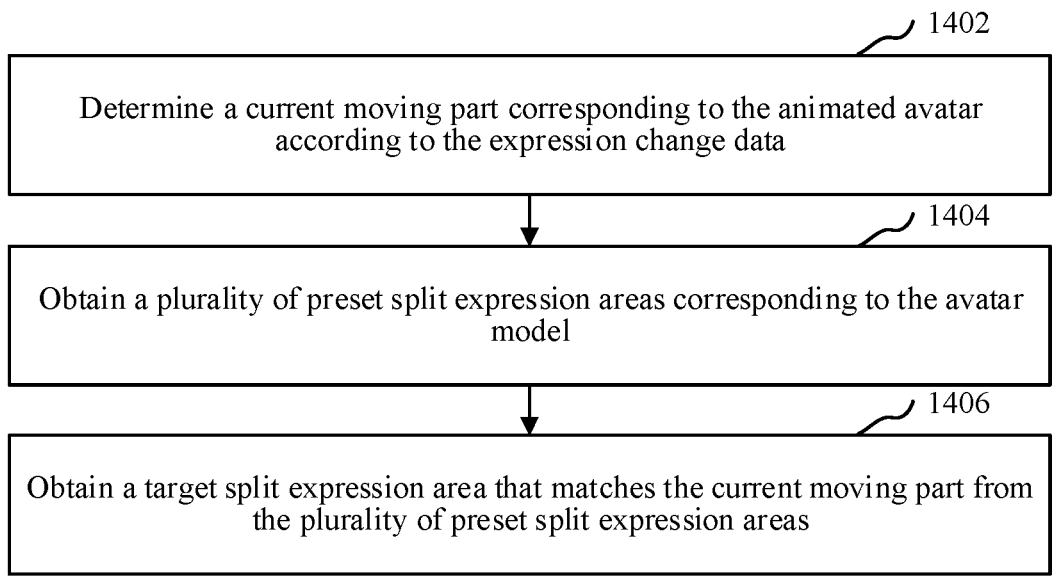
FIG. 14 is a schematic flowchart of determining a target split expression area according to an embodiment of the present disclosure.

In an embodiment, as shown in FIG. 14, the determining a target split-expression-area that matches the expression change data includes:

Step 1402. Determine a current moving part corresponding to the animated avatar according to the expression change data.

As described above, the expression change data is expression data of an expression motion change of the face of the current subject in the three-dimensional face model, and the animated avatar in the avatar model needs to make the same expression as the expression change data. Therefore, a moving part, that is, the current moving part, of the animated avatar in the avatar model that makes the same expression as the expression change data is determined according to the expression change data of the expression change of the face of the current subject in the three-dimensional face model.

Step 1404. Obtain a plurality of preset split-expression-areas corresponding to the avatar model.

Step 1406. Obtain a target split-expression-area that matches the current moving part from the plurality of preset split-expression-areas.

As described above, the avatar model is divided into a plurality of split-expression-areas according to a specific rule, and a split-expression-area is an expression area in the avatar model, in which an expression motion change is made so that an expression corresponding to the expression change data is generated. Specifically, after the current moving part corresponding to the animated avatar is determined according to the expression change data, the avatar model divided in advance into the plurality of split-expression-areas according to the specific rule is obtained. Because an expression motion change can be made in the split-expression-area to generate the same expression as the expression change data, a corresponding split-expression-area, that is, the target split-expression-area, is obtained from the split-expression-areas of the avatar model through matching according to the obtained current moving part. For example, the split-expression-areas of the avatar model are two ears, two eyes, and a mouth. A current moving part corresponding to the expression change data "laugh" is a mouth, and therefore, a target split-expression-area that is obtained from the avatar model and matches the mouth is the mouth in the avatar model.

Figure 15:
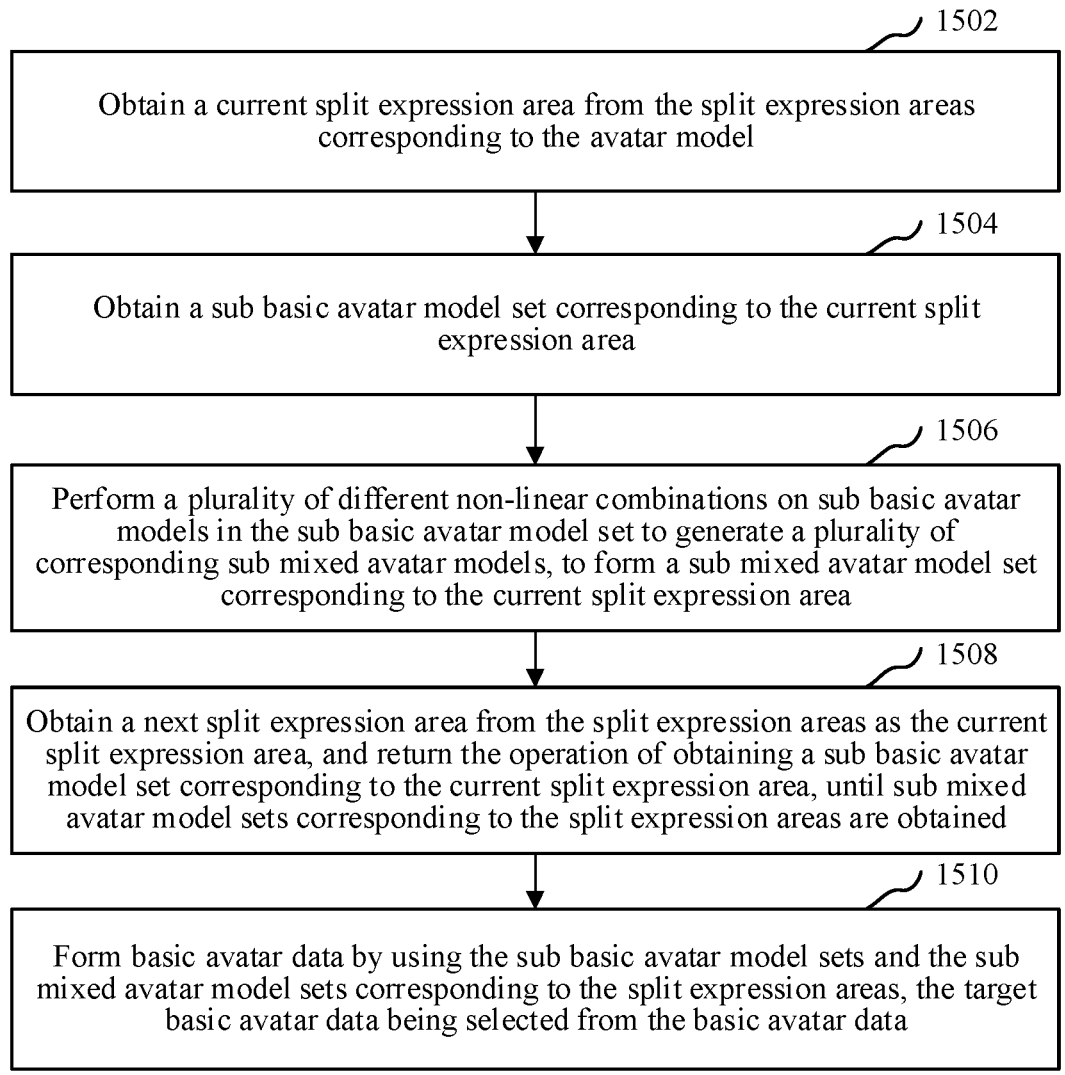
FIG. 15 is a schematic flowchart of an expression animation data processing method according to an embodiment of the present disclosure.

In an embodiment, as shown in FIG. 15, based on FIG. 2, the expression animation data processing method further includes the following steps:

Step 1502. Obtain a current split-expression-area from the split-expression-areas corresponding to the avatar model.

Step 1504. Obtain a sub basic avatar model set corresponding to the current split-expression-area.

As described above, the avatar model is divided into a plurality of split-expression-areas according to a specific rule, and a split-expression-area is used for making an expression motion change to generate the same expression as the expression change data. Therefore, the current split-expression-area is obtained from the split-expression-areas corresponding to the avatar model. The current split-expression-area is a split-expression-area randomly selected from the split-expression-areas in the avatar model.

Figure 16:
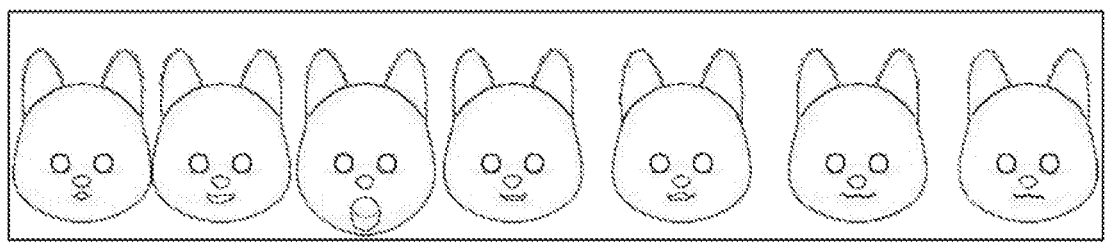
FIG. 16 shows a sub basic avatar model set corresponding to split expression areas according to an embodiment of the present disclosure.

Further, the split-expression-areas each have a corresponding sub basic avatar model set. The sub basic avatar model set is a set of some general expression of the animated avatar that are designed in advance. The expression set is an avatar model set corresponding to general expressions of the animated avatar. FIG. 16 shows a sub basic avatar model set corresponding to split-expression-areas according to an embodiment. Specifically, after the current split-expression-area is randomly selected from the split-expression-areas in the avatar model, all sub basic avatar model sets corresponding to the current split-expression-area are obtained. For example, the current split-expression-area is a mouth. Therefore, all sub basic avatar model sets corresponding to the mouth are obtained.

Step 1506. Perform a plurality of different non-linear combinations on sub basic avatar models in the sub basic avatar model set to generate a plurality of corresponding sub mixed avatar models, to form a sub mixed avatar model set corresponding to the current split-expression-area.

Specifically, after all the sub basic avatar model sets corresponding to the current split-expression-area are obtained, a plurality of different non-linear combinations are performed on sub basic avatar models in all the sub basic avatar model sets to generate a plurality of sub mixed avatar models corresponding to the sub basic avatar models. A mixed avatar model is a mixed expression set corresponding to diversified mixed expressions generated based on general expressions. The mixed expression set is a set of avatar models corresponding to mixed expressions obtained by performing a non-linear combinations on several general expressions of the animated avatar. Further, the sub mixed avatar model set corresponding to the current split-expression-area is formed by using the sub mixed avatar models corresponding to the sub basic avatar models. A calculation formula for calculating the corresponding sub mixed avatar model generated by performing the non-linear combinations on the sub basic avatar model sets is a formula 1:

$$B_i = A_1 E_1 \times A_2 E_2 \times \ldots \times A_i E_i \quad \text{(Formula 1)}$$

$B_i$ represents an $i^{th}$ sub mixed avatar model, and $E_j$ represents a $j^{th}$ sub basic avatar model.

Step 1508. Obtain a next split-expression-area from the split-expression-areas as the current split-expression-area, and return the operation of obtaining a sub basic avatar model set corresponding to the current split-expression-area, until sub mixed avatar model sets corresponding to the split-expression-areas are obtained.

Step 1510. Form basic-avatar-data by using the sub basic avatar model sets and the sub mixed avatar model sets corresponding to the split-expression-areas, the target basic-avatar-data being selected from the basic-avatar-data.

The avatar model is divided into the plurality of split-expression-areas according to the specific rule, and sub mixed avatar model sets corresponding to all the split-expression-areas in the avatar model need to be calculated. Specifically, a next split-expression-area is randomly selected from the split-expression-area in the avatar model as a current split-expression-area. After a sub mixed avatar model set corresponding to the current split-expression-area is obtained, another split-expression-area needs to be randomly selected from the split-expression-area in the avatar model as a current split-expression-area, to return to the operation of obtaining a sub basic avatar model set corresponding to the current split-expression-area, and perform a non-linear combination on the sub basic avatar model set to obtain a corresponding sub mixed avatar model set. Through such iteration, the sub mixed avatar model sets corresponding to the split-expression-areas in the avatar model are obtained. Further, the basic-avatar-data is formed by using the sub mixed avatar model sets and the sub basic avatar model sets corresponding to the split-expression-areas, so that the target basic-avatar-data is obtained for the expression change data through matching. That is, the target basic-avatar-data is selected from the basic-avatar-data.

Figure 17:
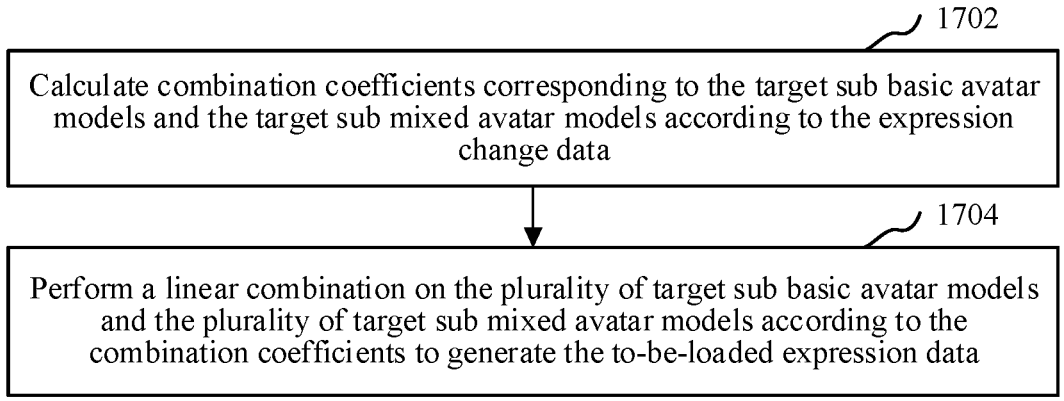
FIG. 17 is a schematic flowchart of generating to-be-loaded expression data according to an embodiment of the present disclosure.

In an embodiment, as shown in FIG. 17, the target basic-avatar-data includes a plurality of target sub basic avatar models and a plurality of target sub mixed avatar models, and the combining the target basic-avatar-data according to the expression change data to generate to-be-loaded expression data includes:

Step 1702. Calculate combination coefficients corresponding to the target sub basic avatar models and the target sub mixed avatar models according to the expression change data.

A sub basic avatar model is also an avatar model that is split into a plurality of split-expression-areas according to a specific rule. A split-expression-area is an expression area in which a motion change is made. Change values or expression weight-coefficients of expression motion changes in split-expression-areas in the sub basic avatar models are used as combination coefficients of the sub basic avatar models. The combination coefficients may also be referred to as expression-change-coefficients. Similarly, because the sub mixed avatar models are calculated by performing a non-linear combination on corresponding sub basic avatar models, the sub mixed avatar models all have corresponding combination coefficients. Specifically, the target split-expression-area is determined according to the expression change data obtained in the three-dimensional face model, and the combination coefficients corresponding to the target sub basic avatar models and the combination coefficients corresponding to the target sub mixed avatar models are determined according to a change value of an expression motion change in the target split-expression-area or an expression weight-coefficient corresponding to the expression motion change.

Step 1704. Perform a linear combination on the plurality of target sub basic avatar models and the plurality of target sub mixed avatar models according to the combination coefficients to generate the to-be-loaded expression data.

Specifically, after the combination coefficients corresponding to the target sub basic avatar models and the target sub mixed avatar models are calculated according to the expression change data, a linear combination is performed on the plurality of target sub basic avatar models and the plurality of target sub mixed avatar models according to the corresponding combination coefficients to generate the to-be-loaded expression data corresponding to the expression change data. The to-be-loaded expression data may also be referred to as expression data that is the same as current expression data of the subject collected by the photographing apparatus. Specifically, the linear combination may be performed on the plurality of target sub basic avatar models and the plurality of target sub mixed avatar models according to the combination coefficients by using a formula 2 to generate the to-be-loaded expression data corresponding to the expression change data. The formula 2 is as follows:

$$E_{user}=A_1E_1+A_2E_2+\ldots+A_nE_n+A_1B_1+A_2B_2+\ldots+A_mB_m \quad \text{(Formula 2)}$$

where $E_{user}$ is the current expression data of the subject collected by the photographing apparatus, that is, the to-be-loaded expression data, $E_i$ is a sub basic avatar model, and $B_j$ is a sub mixed avatar model.

Figure 18:
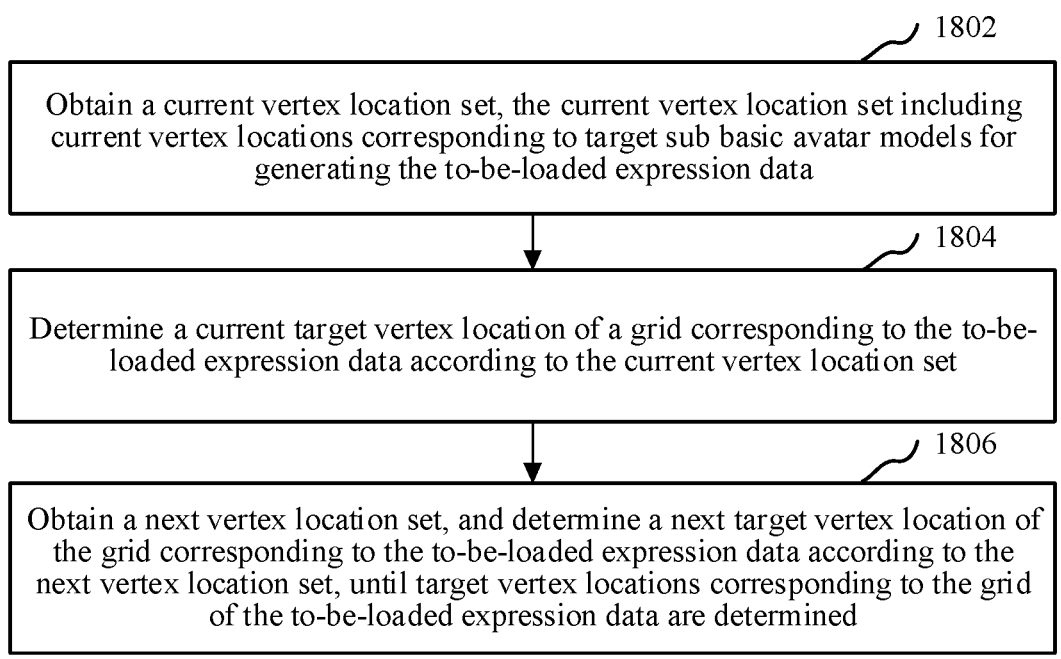
FIG. 18 is a schematic flowchart of loading to-be-loaded expression data into a target split expression area according to an embodiment of the present disclosure.

In an embodiment, as shown in FIG. 18, the loading the to-be-loaded expression data into the target split-expression-area includes the followings.

Step 1802. Obtain a current vertex location set, the current vertex location set including current vertex locations corresponding to target sub basic avatar models for generating the to-be-loaded expression data.

The target sub basic avatar models have the same topology structure as the avatar model of the animated avatar, which are of the same size in space. The topology structure is a location relationship between vertexes forming a sub basic avatar model. Different target sub basic avatar models have the same quantity of grid vertexes, but may have different vertex locations. For example, a vertex location of a basic avatar model corresponding to smile is different from a vertex location of a basic avatar model corresponding to laugh. The target sub basic avatar models herein are qualified sub basic avatar models selected from the basic-avatar-data.

Specifically, because the to-be-loaded expression data is generated by combining the target basic-avatar-data according to the expression change data, the target basic-avatar-data is selected from the basic-avatar-data, and the basic-avatar-data is formed by using the sub mixed avatar model sets and the sub basic avatar model sets corresponding to the split-expression-areas in the avatar model, the target sub basic avatar models include sub basic avatar models and sub mixed avatar models. Further, a vertex location is randomly selected from vertex locations corresponding to each target sub basic avatar model for generating the to-be-loaded expression data as a current vertex location, and the current vertex location set is formed by using current vertex locations in the target sub basic avatar models.

Step 1804. Determine a current target vertex location of a grid corresponding to the to-be-loaded expression data according to the current vertex location set.

Step 1806. Obtain a next vertex location set, and determine a next target vertex location of the grid corresponding to the to-be-loaded expression data according to the next vertex location set, until target vertex locations corresponding to the grid of the to-be-loaded expression data are determined.

Because the current vertex location set is formed by using the current vertex locations that each are a vertex location randomly selected from vertex locations corresponding to each target sub basic avatar model for generating the to-be-loaded expression data, and the to-be-loaded expression data is generated by an expression motion change in a split-expression-area in the avatar model, the current target vertex location of the grid corresponding to the to-be-loaded expression data is calculated according to the obtained current vertex location set. A formula 3 for calculating the current target vertex location of the grid corresponding to the to-be-loaded expression data according to the current vertex location set is as follows:

$$V_L=A_1V_{E1}+A_2V_{E2}+\ldots+A_nV_{En}+A_1V_{B1}+A_2V_{B2}+\ldots+A_mV_{Bm} \quad \text{Formula 3}$$

where $V_i$ represents an $i^{th}$ vertex, that is, a current target vertex location, and $V_{E1}$ represents a corresponding vertex in a target sub basic avatar model $E_1$.

Further, after the current target vertex location of the grid corresponding to the to-be-loaded expression data is obtained according to the current vertex location set, a next vertex location needs to be randomly selected from the vertex locations corresponding to each target sub basic avatar model for generating the to-be-loaded expression data as a current vertex location, a next vertex location set is formed by using current vertex locations corresponding to the target sub basic avatar models for generating the to-be-loaded expression data, and a next target vertex location of the grid corresponding to the to-be-loaded expression data is determined according to the next vertex location set, until the target vertex locations corresponding to the grid of the to-be-loaded expression data are determined.

Figure 19:
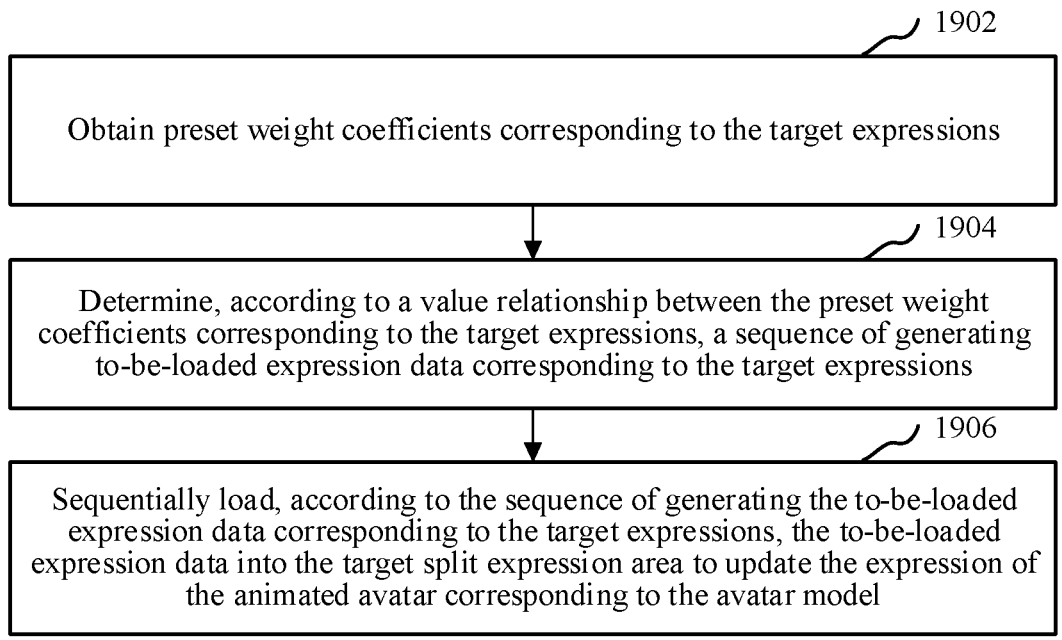
FIG. 19 is a schematic flowchart of generating to-be-loaded expression data according to an embodiment of the present disclosure.

In an embodiment, as shown in FIG. 19, in a case that the expression change data corresponds to updates of a plurality of target expressions, the obtaining target basic-avatar-data that matches the target split-expression-area, and combining the target basic-avatar-data according to the expression change data to generate to-be-loaded expression data includes:

Step 1902. Obtain preset weight-coefficients corresponding to the target expressions.

Step 1904. Determine, according to a value relationship between the preset weight-coefficients corresponding to the target expressions, a sequence of generating to-be-loaded expression data corresponding to the target expressions.

To reduce workload in expression data calculation for an avatar, different weight-coefficients are preset for expressions. A weight-coefficient is a degree of relative importance of an index in overall evaluation. Therefore, when the expression change data corresponds to updates of a plurality of target expressions, corresponding preset weight-coefficients are obtained according to the target expressions. Because different expressions correspond to different weight-coefficients, a sequence of generating, that is, a sequence of loading, to-be-loaded expression data corresponding to the target expressions needs to be determined according to a value relationship between the preset weight-coefficients corresponding to the target expressions.

Figure 20:
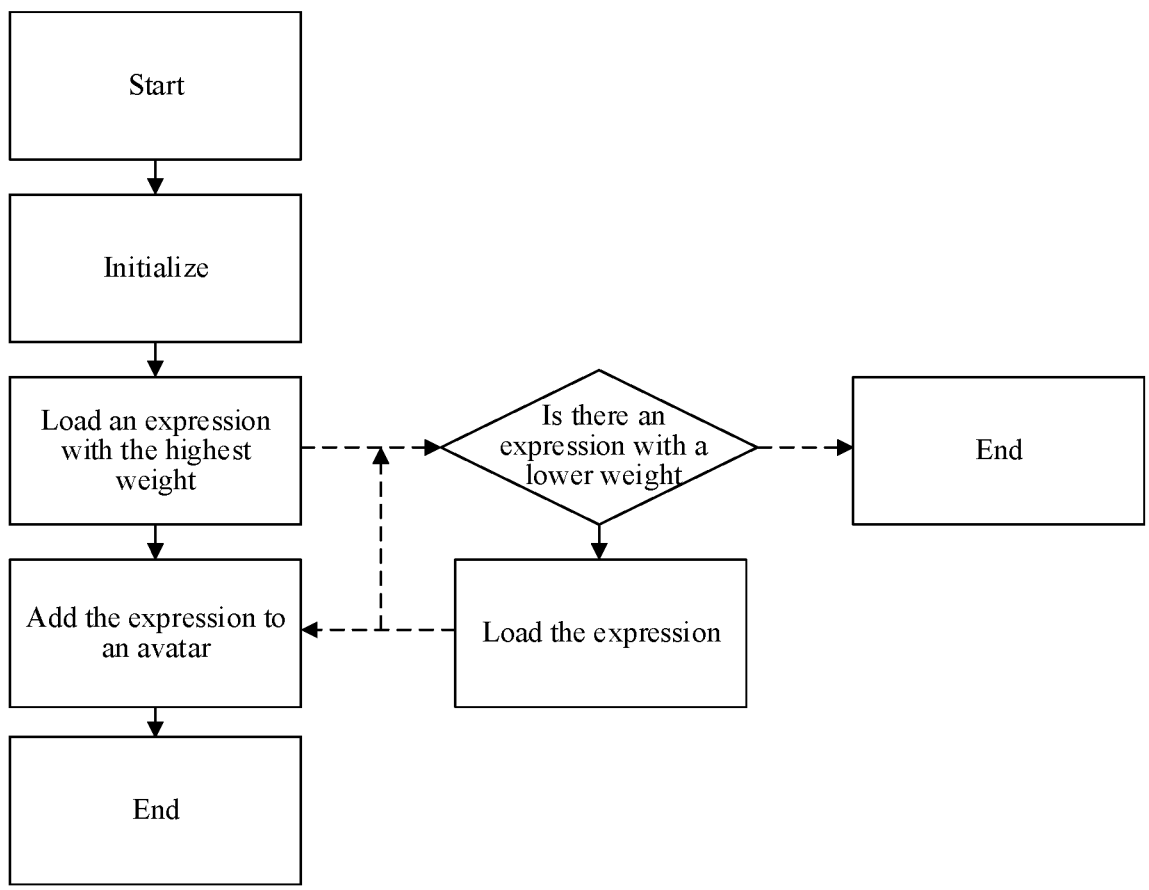
FIG. 20 is a schematic flowchart of loading expression data according to weights according to an embodiment of the present disclosure.

FIG. 20 is a schematic principle diagram of loading expression data according to an embodiment. Specifically, if the expression change data corresponds to updates of a plurality of target expressions, corresponding target split-expression-areas are determined from the split-expression-areas corresponding to the avatar model according to the target expressions, and target basic-avatar-data that matches the target split-expression-areas is obtained. Further, preset weight-coefficients corresponding to the target basic-avatar-data are obtained, and a sequence of generating to-be-loaded expressions corresponding to the target basic-avatar-data is determined according to a value relationship between the preset weight-coefficients corresponding to the target basic-avatar-data. That is, a larger weight-coefficient indicates that corresponding target basic-avatar-data is loaded earlier. For example, when the updates of the plurality of target expressions corresponding to the expression change data are smile and eye opening, because a weight-coefficient of the target expression "eye opening" is greater than a weight-coefficient of the target expression "smile", during generation of to-be-loaded data, to-be-loaded data corresponding to "eye opening" is generated earlier than to-be-loaded data corresponding to "smile".

Step 1906. Sequentially load, according to the sequence of generating the to-be-loaded expression data corresponding to the target expressions, the to-be-loaded expression data into the target split-expression-area to update the expression of the animated avatar corresponding to the avatar model.

As shown in FIG. 20, specifically, after the sequence of generating the to-be-loaded expression data corresponding to the target expressions is determined according to the value relationship between the preset weight-coefficients corresponding to the target expressions, the to-be-loaded expression data is sequentially loaded into the target split-expression-area corresponding to the to-be-loaded expression data according to the sequence of generating the to-be-loaded expression data corresponding to the target expressions, so that the animated avatar in the avatar model can make the expression change corresponding to the current expression of the three-dimensional face model. That is, the animated avatar in the avatar model has the same expression as the subject in the image collected by the photographing apparatus. For example, when the updates of the plurality of target expressions corresponding to the expression change data are smile and eye opening, if a weight-coefficient of the target expression "eye opening" is greater than a weight-coefficient of the target expression "smile", to-be-loaded data corresponding to "eye opening" is first loaded into a split-expression-area "eye" in the avatar model, and then to-be-loaded data corresponding to "smile" is loaded into a split-expression-area "mouth" in the avatar model.

Further, when the to-be-loaded expression data is sequentially loaded into the target split-expression-area to update the expression of the animated avatar corresponding to the avatar model, to ensure smoothness of the animated avatar, UV splitting is used to prevent splitting or other problems of UV from causing a crack between the split-expression-areas of the avatar model when the expression data is loaded into the avatar model. The UV splitting is determining texture coordinates of a to-be-pasted picture. How a to-be-pasted picture of the avatar model is pasted may be determined through the UV splitting. A UV splitting line is distributed at an invisible portion in the avatar model, for example, a back side of a head or the top of the head.

Figure 21:
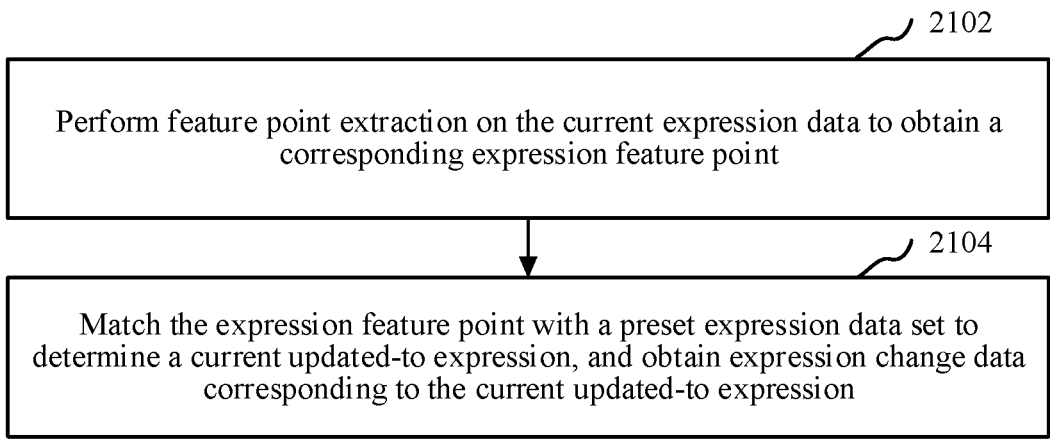
FIG. 21 is a schematic flowchart of obtaining expression change data according to an embodiment of the present disclosure.

In an embodiment, as shown in FIG. 21, the obtaining expression change data from the current expression data includes the followings.

Step 2102. Perform feature point extraction on the current expression data to obtain a corresponding expression feature point.

Step 2104. Match the expression feature point with a preset expression data set to determine a current updated-to expression, and obtain expression change data corresponding to the current updated-to expression.

As described above, the three-dimensional face model has facial expression data, that is, the current expression data, of the subject in the image collected by using the photographing apparatus. Because some expressions of the face of the subject do not have any expression change, expression change data of an expression change needs to be obtained from the current expression data of the subject. Specifically, facial feature point extraction is performed on the current expression data in the three-dimensional face model to obtain a corresponding expression feature point, and a current updated-to expression is obtained from a preset expression data set through matching according to the extracted expression feature point. Further, corresponding expression change data is obtained according to the current updated-to expression. The expression data set may also be referred to as an expression library. For example, the current expression data is expression data of the five sense organs of the subject, and an expression update of the subject is smile. Specifically, feature point extraction is first performed on the expression data of the five sense organs to obtain expression feature points corresponding to expressions of the five sense organs. Further, the expression feature points corresponding to the expressions of the five sense organs are compared with all expressions in the expression library to obtain the current updated-to expression "smile". Therefore, expression change data corresponding to "smile" is obtained.

The above description is applicable when a facial expression of the subject in a previous image frame is expressionless, that is, the five sense organs are parts that do not have any expression change, and the face of the subject in a current image frame has an expression change.

Figure 22:
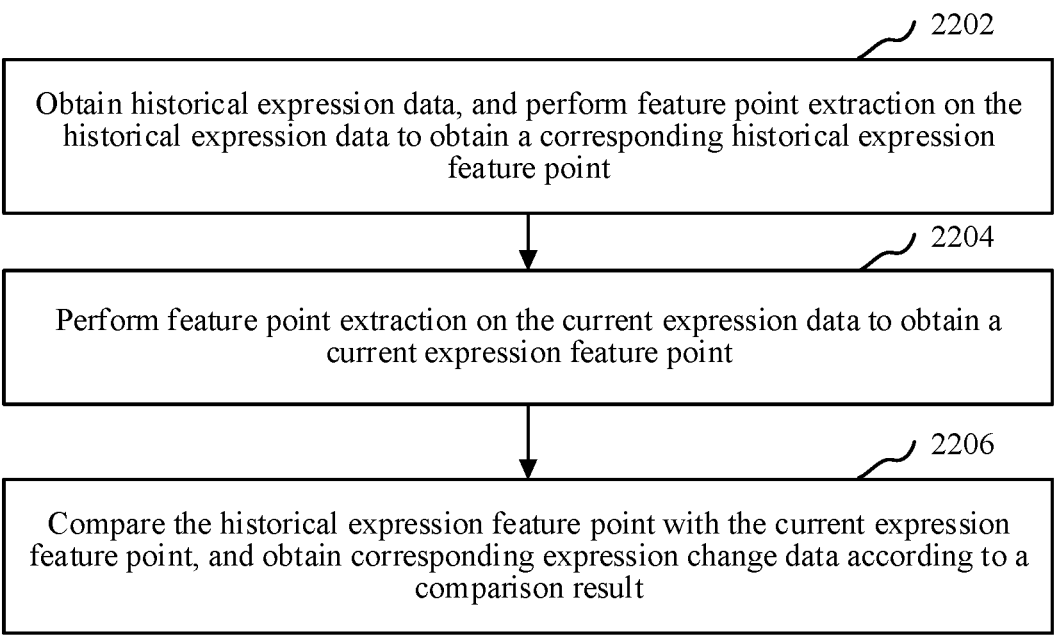
FIG. 22 is a schematic flowchart of obtaining expression change data according to another embodiment of the present disclosure.

In an embodiment, as shown in FIG. 22, the obtaining expression change data from the current expression data includes the followings.

Step 2202. Obtain historical expression data, and perform feature point extraction on the historical expression data to obtain a corresponding historical expression feature point.

Step 2204. Perform feature point extraction on the current expression data to obtain a current expression feature point.

Step 2206. Compare the historical expression feature point with the current expression feature point, and obtain corresponding expression change data according to a comparison result.

A facial expression of the subject in a previous image frame has an expression change, but some expressions of the face of the subject in a current image frame remain unchanged relative to the previous image frame, and another expression may have a change. Therefore, historical expression data of the subject in the previous image frame is obtained, and feature point extraction is performed on the historical expression data to obtain a corresponding historical expression feature point. Further, feature point extraction is performed on current expression data of the subject in the current image frame to obtain a corresponding current expression feature point. Then the historical expression feature point is compared with the current expression feature point to obtain corresponding expression change data. For example, if the historical expression data is laugh, and the current expression data is laugh and eye opening, feature point extraction is performed on each of the historical expression data and the current expression data to obtain a corresponding historical expression feature point and current expression feature point. After the historical expression feature point is compared with the current expression feature point, it is learned that a feature point corresponding to "laugh" in the current expression data remains changed. Therefore, it is determined according to the comparison result that expression change data of the subject in the current image frame is "eye opening".

The above description is applicable when a facial expression of the subject in a previous image frame has an expression change, but some expressions of the face of the subject in a current image frame remain unchanged relative to the previous image frame, and another expression has a change. For example, the expression change of the subject in the previous image frame is laugh, the mouth of the subject in the current image frame does not have any change, and the face of the subject remains laughing.

In an embodiment, the expression animation data processing method further includes: obtaining a corresponding first background image from preset background images according to the expression change data, and loading the first background image into a virtual environment in which the animated avatar corresponding to the avatar model is located; or obtaining voice data, obtain a corresponding second background image from preset background images according to the voice data, and loading the second background image into a virtual environment in which the animated avatar corresponding to the avatar model is located.

In one embodiment, the virtual environment in which the animated avatar is located is further rendered with different textures according to different backgrounds, thereby achieving a relatively strong sense of reality. The virtual environment may be rendered in two manners. One manner is an expression change data-based control manner. Specifically, after the expression change data is obtained, a corresponding first background image is obtained according to special expression data in the expression change data from background images pre-delivered by a cloud server, and the obtained first background image is loaded into the virtual environment in which the animated avatar corresponding to the avatar model is located. For example, the expression change data is making a face, the first background image obtained through matching according to the expression change data from the background images pre-delivered by the cloud server is a star flashing background image. In this way, the virtual environment in which the animated avatar is located is rendered.

Figure 23:
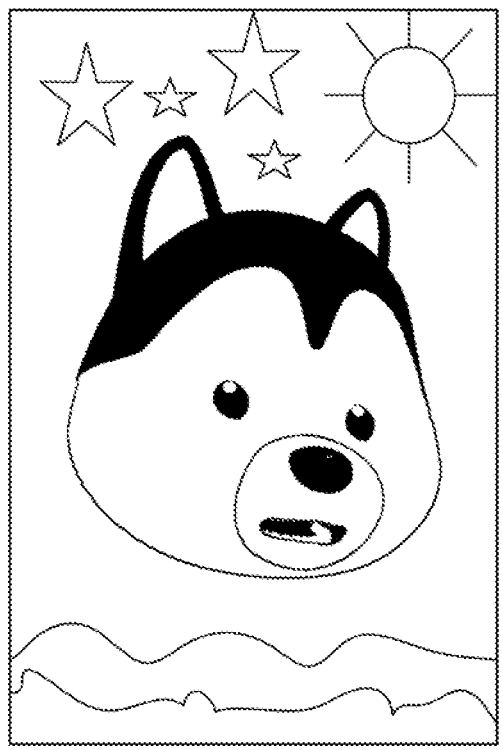
FIG. 23 is a schematic diagram of a background image in a virtual environment in which an animated avatar is located according to an embodiment of the present disclosure.

The other manner is a voice data-based control manner. Specifically, the voice data is voice data collected by using a voice collection apparatus of the terminal. A second background image that matches the voice data may be obtained according to a special word or sentence in the voice data from background images pre-delivered by a cloud server, and the obtained second background image is loaded into the virtual environment in which the animated avatar corresponding to the avatar model is located. For example, the obtained voice data is happy new year, a corresponding second background image with a theme of new year is obtained through matching according to "happy new year" from the background images pre-delivered by the cloud server, and an animation corresponding to firecrackers is present in the virtual environment. FIG. 23 is a schematic diagram of a background image in a virtual environment in which an animated avatar is located according to an embodiment. After the target background image is selected in either of the two manners from the background images pre-delivered by the cloud server, the target background image is loaded into the virtual environment in which the animated avatar is located.

In a specific embodiment, an expression animation data processing method is provided. The method specifically includes the followings.

Step 2402. Obtain a location of a terminal, and establish a virtual space by using the location of the terminal as an origin.

Step 2404. Determine a corresponding target location of an animated avatar in the virtual space according to a relative location of the terminal in the real world, and generate an initial animated avatar at the target location.

Step 2406. After the face of a subject is collected by using a camera of the terminal, extract a feature point from the face of the subject in an image, and establish a three-dimensional human face model according to the extracted facial feature point.

Step 2408. Obtain current expression data according to expression data of the subject in the three-dimensional human face model.

Step 2410. Perform step 2410*a* when a facial expression of the subject in a previous image frame is expressionless and the facial expression of the subject in a current image frame has an expression motion change; or perform step 2410*b* when an expression of a part in the face of the subject in a previous image frame has an expression motion change, but an expression of a part in the face of the subject in a current image frame remains unchanged, and an expression of another part has a new expression motion change.

Step 2410*a*. Extract a feature point(s) from the current expression data, match the extracted feature point with expression data in an expression library to determine a current updated-to expression, and obtain expression change data corresponding to the current updated-to expression.

Step 2410*b*. Obtain historical expression data, extract feature points from the historical expression data and the current expression data to obtain a corresponding historical expression feature point and current expression feature point, and compare the historical expression feature point with the current expression feature point to obtain expression change data.

Step 2412. Determine a corresponding current moving part according to the expression change data, and obtain a target split-expression-area that matches the current moving part according to the current moving part from an avatar model that is split into a plurality of split-expression-areas according to a specific rule.

Step 2414. Obtain target basic-avatar-data that matches the target split-expression-area, and combine the target basic-avatar-data according to the expression change data to generate to-be-loaded expression data.

Step 2414*a*. Calculate combination coefficients corresponding to target general expression sets and target mixed expression sets in the target basic-avatar-data according to the expression change data, and perform a linear combination on the target general expression sets and the target mixed expression sets according to the combination coefficients to generate to-be-loaded expression data.

Step 2414b. If the expression change data has a plurality of target expressions, obtain preset weight-coefficients of the target expressions, and determine, according to a value relationship between the preset weight-coefficients of the target expressions, a sequence of generating to-be-loaded expression data corresponding to the target expressions.

Step 2416. Load the to-be-loaded expression data into the target split-expression-area to update an expression of an animated avatar corresponding to the avatar model.

Step 2416a. Form a current vertex location set according to vertex locations corresponding to the target general expression sets and the target mixed expression sets corresponding to the to-be-loaded expression data, determine a current target vertex location of a grid corresponding to the to-be-loaded expression data according to the current vertex location set, obtain a next vertex location set, and determine a next target vertex location of the grid corresponding to the to-be-loaded expression data according to the next vertex location set, until target vertex locations corresponding to the grid of the to-be-loaded expression data are determined.

Step 2416b. If the expression change data has the plurality of target expressions, after the sequence of generating the to-be-loaded expression data corresponding to the target expressions is determined, sequentially load the to-be-loaded expression data into the target split-expression-area according to the sequence of generating to update the expression of the animated avatar corresponding to the avatar model Step 2418. Determine an obvious expression portion corresponding to the animated avatar according to the expression change data.

Step 2420. Obtain a subtle expression portion associated with the obvious expression portion.

Step 2422. Calculate motion status data corresponding to the obvious expression portion according to the expression change data, and determine bone control data corresponding to the subtle expression portion according to the motion status data corresponding to the obvious expression portion.

Step 2422a. If the obvious expression portion is the head of the animated avatar, calculate a nutation angle in an Euler angle of a bone of an ear by using a pitch angular velocity of rotation of the head, a corresponding compensation value required in calculation, and a maximum pitch angle threshold controlled by a cloud end, calculate a precession angle in the Euler angle of the bone of the ear by using a yaw angular velocity of rotation of the head, a corresponding compensation value required in calculation, and a maximum yaw angle threshold controlled by the cloud end, and determine the Euler angle of the bone of the ear by using the nutation angle and the precession angle.

Step 2422b. If the obvious expression portion is the mouth of the animated avatar, calculate an Euler angle of a bone of a jaw by using a maximum pitch angle threshold controlled by a cloud end and an expression coefficient corresponding to mouth opening in the expression change data.

Step 2422c. If the obvious expression portion is an eye of the animated avatar, calculate a nutation angle in an Euler angle of a bone of an eyeball by using a maximum pitch angle threshold controlled by a cloud end, a rotation direction value, and an eye expression-change-coefficient in the expression change data, calculate a precession angle in the Euler angle of the bone of the eyeball by using a maximum yaw angle threshold controlled by the cloud end, a rotation direction value, and the eye expression-change-coefficient in the expression change data, and determine the Euler angle of the bone of the eyeball by using the nutation angle and the precession angle.

Step 2424. Control, according to the bone control data, a bone motion corresponding to the subtle expression portion, to update the expression of the animated avatar corresponding to the avatar model.

Step 2426. Obtain voice data, and determine a corresponding current subtle expression portion according to the voice data.

Step 2428. Obtain a bone animation corresponding to the current subtle expression portion, and play the bone animation, to update the expression of the animated avatar corresponding to the avatar model.

Step 2430. Obtain a current split-expression-area from the split-expression-areas corresponding to the avatar model.

Step 2432. Obtain a general expression set corresponding to the current split-expression-area.

Step 2434. Perform a plurality of different non-linear combinations on avatar models corresponding to general expressions in the general expression set to generate avatar models corresponding to a plurality of corresponding mixed expressions, to form a mixed expression set corresponding to the current split-expression-area.

Step 2436. Obtain a next split-expression-area in the split-expression-areas as a current split-expression-area, and return to the step of obtaining a general expression set corresponding to the current split-expression-area, until mixed expression sets corresponding to the split-expression-areas are obtained.

Step 2438. Form a corresponding expression set by using the general expression sets and the mixed expression sets corresponding to the split-expression-areas, the target basic-avatar-data being selected from expression data in the expression set.

Step 2440. Obtain a corresponding first background image from preset background images according to the expression change data, and load the first background image into a virtual environment in which the animated avatar corresponding to the avatar model is located.

Step 2442. Obtain voice data, obtain a corresponding second background image from preset background images according to the voice data, and load the second background image into a virtual environment in which the animated avatar corresponding to the avatar model is located.

For all the schematic flowcharts of the expression animation data processing method, it is to be understood that, although the steps in the flowcharts are sequentially shown according to indication of arrows, the steps are not necessarily sequentially performed according to a sequence indicated by the arrows. Unless otherwise explicitly stated in this specification, these steps are not necessarily performed in a strictly limited order, and the steps may be performed in other orders. Besides, at least some steps in the flowchart may include a plurality of sub-steps or a plurality of stages, the sub-steps or stages are not necessarily performed at a same moment and may be performed at different moments, the sub-steps or stages are not necessarily sequentially performed, and the sub-steps or stages and at least some of other steps or sub-steps or stages of other steps may be performed in turn or alternately.

Figure 24:
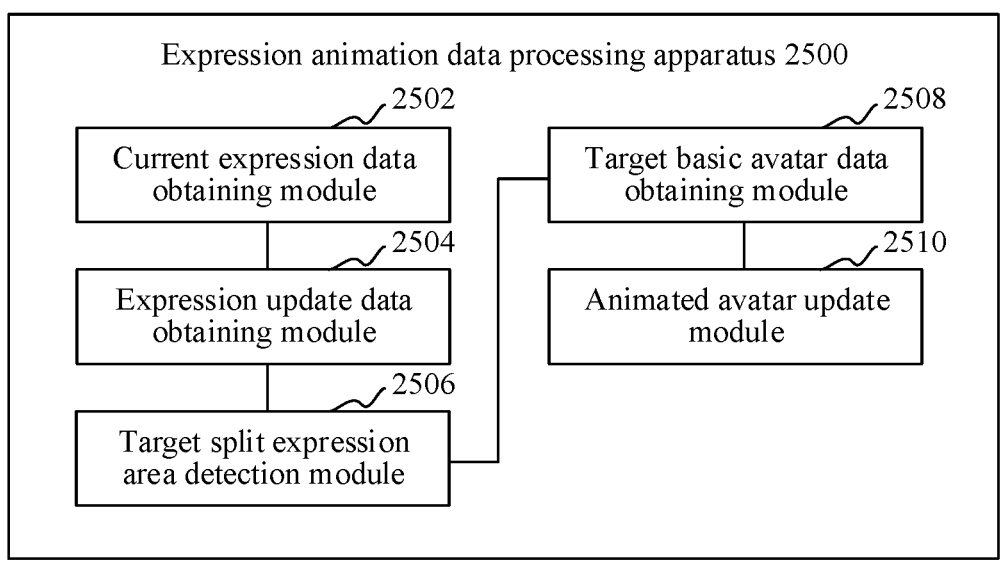
FIG. 24 is a structural block diagram of an expression animation data processing apparatus according to an embodiment of the present disclosure.

As shown in FIG. 24, in an embodiment, an expression animation data processing apparatus 2500 is provided. The expression animation data processing apparatus 2500 includes a current expression data obtaining module 2502, an expression update data obtaining module 2504, a target split-expression-area detection module 2506, a target basic-avatar-data obtaining module 2508, and an animated avatar update module 2510.

The current expression data obtaining module 2502 is configured to determine a location of a human face in an image, obtain an avatar model, and obtain current expression data according to the location of the human face in the image and a three-dimensional face model. The expression update data obtaining module 2504 is configured to obtain expression change data from the current expression data.

The target split-expression-area detection module 2506 is configured to determine a target split-expression-area that matches the expression change data, the target split-expression-area being selected from split-expression-areas corresponding to the avatar model.

The target basic-avatar-data obtaining module 2508 is configured to obtain target basic-avatar-data that matches the target split-expression-area, and combine the target basic-avatar-data according to the expression change data to generate to-be-loaded expression data.

The animated avatar update module 2510 is configured to load the to-be-loaded expression data into the target split-expression-area to update an expression of an animated avatar corresponding to the avatar model.

Figure 25:
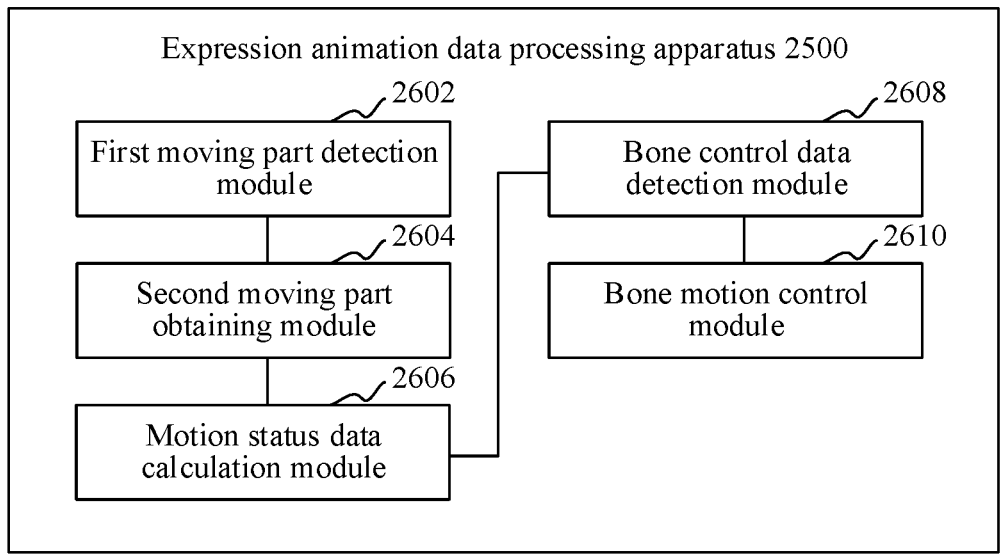
FIG. 25 is a structural block diagram of an expression animation data processing apparatus according to another embodiment of the present disclosure.

As shown in FIG. 25, in an embodiment, the expression animation data processing apparatus 2500 further includes: a first moving part detection module 2602, a second moving part obtaining module 2604, a motion status data calculation module 2606, a bone control data detection module 2608, and a bone motion control module 2610.

The first moving part detection module 2602 is configured to determine a first moving part corresponding to the animated avatar according to the expression change data; the second moving part obtaining module 2604 is configured to obtain a second moving part associated with the first moving part; and the motion status data calculation module 2606 is configured to calculate motion status data corresponding to the first moving part according to the expression change data.

The bone control data detection module 2608 is configured to determine bone control data corresponding to the second moving part according to the motion status data corresponding to the first moving part; and the bone motion control module 2610 is configured to control a bone motion corresponding to the second moving part according to the bone control data, to update the expression of the animated avatar corresponding to the avatar model.

In an embodiment, in a case that the first moving part is a first preset part, the motion status data calculation module is further configured to: calculate a yaw angular velocity and a pitch angular velocity corresponding to the first preset part according to the expression change data; determine first bone control data corresponding to the second moving part according to the pitch angular velocity, a preset maximum pitch angle threshold, and a first preset compensation value; and determine second bone control data corresponding to the second moving part according to the yaw angular velocity, a preset maximum yaw angle threshold, and a second preset compensation value; and the bone control data detection module is further configured to determine the bone control data corresponding to the second moving part according to the first bone control data and the second bone control data.

In an embodiment, in a case that the first moving part is a second preset part, the motion status data calculation module is further configured to calculate an expression-change-coefficient corresponding to the second preset part according to the expression change data; and the bone control data detection module is further configured to determine the bone control data corresponding to the second moving part according to the expression-change-coefficient and a preset maximum pitch angle threshold.

In an embodiment, in a case that the first moving part is a third preset part, the motion status data calculation module is further configured to: calculate an expression-change-coefficient corresponding to the third preset part according to the expression change data; calculate a pitch angle direction value and a yaw angle direction value corresponding to the third preset part according to the expression change data; determine first bone control data corresponding to the second moving part according to the expression-change-coefficient, the pitch angle direction value, and a preset maximum pitch angle threshold; and determine second bone control data corresponding to the second moving part according to the expression-change-coefficient, the yaw angle direction value, and a preset maximum yaw angle threshold; and the bone control data detection module is further configured to determine the bone control data corresponding to the second moving part according to the first bone control data and the second bone control data.

Figure 26:
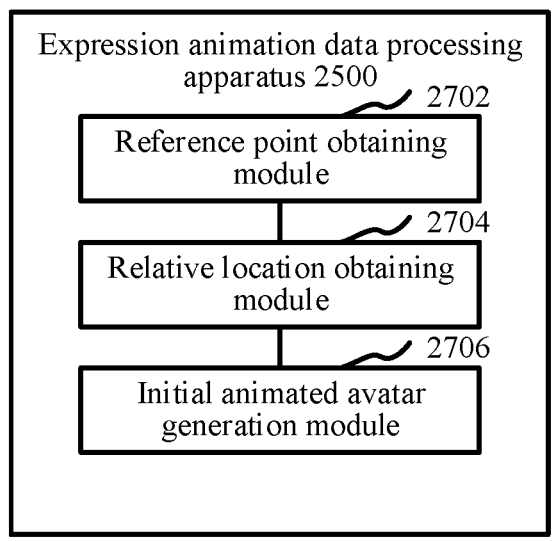
FIG. 26 is a structural block diagram of an expression animation data processing apparatus according to still another embodiment of the present disclosure.

As shown in FIG. 26, in an embodiment, the expression animation data processing apparatus 2500 further includes: a reference point obtaining module 2702, a relative location obtaining module 2704, and an initial animated avatar generation module 2706.

The reference point obtaining module 2702 is configured to obtain a reference point, determine a virtual space coordinate origin according to the reference point, and establish a virtual space according to the virtual space coordinate origin; the relative location obtaining module 2704 is configured to obtain a relative location of a subject relative to the reference point; and the initial animated avatar generation module 2706 is configured to determine a target location of an animated avatar corresponding to the subject in the virtual space according to the relative location, and generate an initial animated avatar corresponding to the subject in the virtual space according to the target location.

Figure 27:
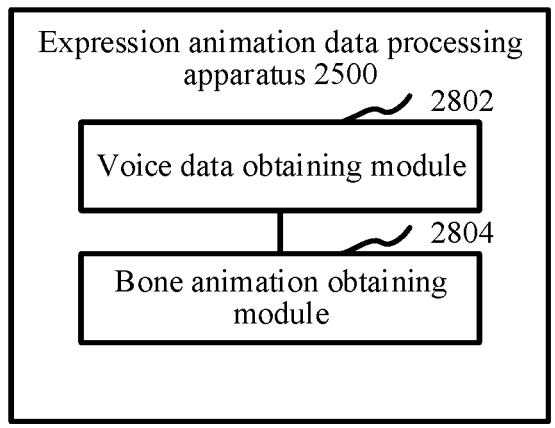
FIG. 27 is a structural block diagram of an expression animation data processing apparatus according to yet another embodiment of the present disclosure.

As shown in FIG. 27, in an embodiment, the expression animation data processing apparatus further includes: a voice data obtaining module 2802 and a bone animation obtaining module 2804.

The voice data obtaining module 2802 is configured to obtain voice data, and determine a corresponding current second moving part according to the voice data; and the bone animation obtaining module 2804 is configured to obtain a bone animation corresponding to the current second moving part, and play the bone animation, to update the expression of the animated avatar corresponding to the avatar model.

Figure 28:
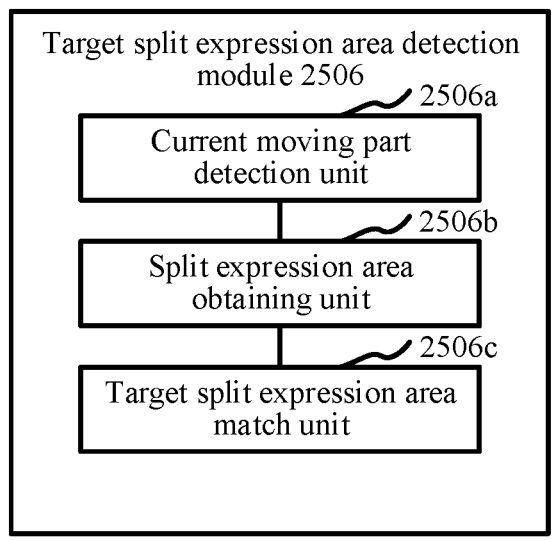
FIG. 28 is a structural block diagram of a target split expression area detection module according to an embodiment of the present disclosure.

As shown in FIG. 28, in an embodiment, the target split-expression-area detection module 2506 includes: a current moving part detection unit 2506*a*, a split-expression-area obtaining unit 2506*b*, and a target split-expression-area match unit 2506*c*.

The current moving part detection unit 2506*a* is configured to determine a current moving part corresponding to the animated avatar according to the expression change data; the split-expression-area obtaining unit 2506*b* is configured to obtain a plurality of preset split-expression-areas corresponding to the avatar model; and the target split-expression-area match unit 2506*c* is configured to obtain a target split-expression-area that matches the current moving part from the plurality of preset split-expression-areas.

Figure 29:
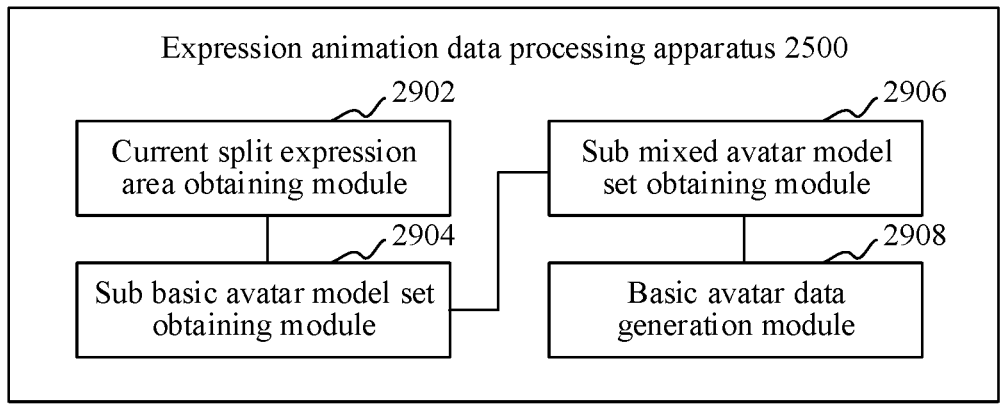
FIG. 29 is a structural block diagram of an expression animation data processing apparatus according to another embodiment of the present disclosure.

As shown in FIG. 29, in an embodiment, the expression animation data processing apparatus 2500 further includes:

a current split-expression-area obtaining module 2902, a sub basic avatar model set obtaining module 2904, a sub mixed avatar model set obtaining module 2906, and a basic-avatar-data generation module 2908.

The current split-expression-area obtaining module 2902 is configured to obtain a current split-expression-area from the split-expression-areas corresponding to the avatar model; and the sub basic avatar model set obtaining module 2904 is configured to obtain a sub basic avatar model set corresponding to the current split-expression-area.

The sub mixed avatar model set obtaining module 2906 is configured to perform a plurality of different non-linear combinations on sub basic avatar models in the sub basic avatar model set to generate a plurality of corresponding sub mixed avatar models, to form a sub mixed avatar model set corresponding to the current split-expression-area.

The sub basic avatar model set obtaining module 2904 is further configured to obtain a next split-expression-area from the split-expression-areas as the current split-expression-area, and return the operation of obtaining a sub basic avatar model set corresponding to the current split-expression-area, until sub mixed avatar model sets corresponding to the split-expression-areas are obtained.

The basic-avatar-data generation module 2908 is configured to form basic-avatar-data by using the sub basic avatar model sets and the sub mixed avatar model sets corresponding to the split-expression-areas, the target basic-avatar-data being selected from the basic-avatar-data.

In an embodiment, the target basic-avatar-data obtaining module 2508 is further configured to: calculate combination coefficients corresponding to the target sub basic avatar models and the target sub mixed avatar models according to the expression change data; and perform a linear combination on the plurality of target sub basic avatar models and the plurality of target sub mixed avatar models according to the combination coefficients to generate the to-be-loaded expression data.

Figure 30:
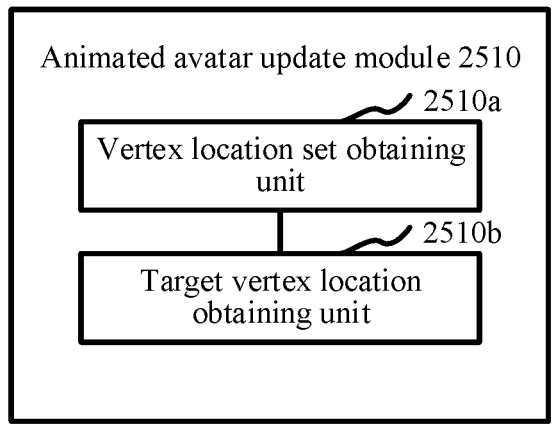
FIG. 30 is a structural block diagram of an animated avatar update module according to an embodiment of the present disclosure.

As shown in FIG. 30, in an embodiment, the animated avatar update module 2510 further includes: a vertex location set obtaining unit 2510*a* and a target vertex location obtaining unit 2510*b*.

The vertex location set obtaining unit 2510*a* is configured to obtain a current vertex location set, the current vertex location set including current vertex locations corresponding to target sub basic avatar models for generating the to-be-loaded expression data.

The target vertex location obtaining unit 2510*b* is configured to determine a current target vertex location of a grid corresponding to the to-be-loaded expression data according to the current vertex location set; and obtain a next vertex location set, and determine a next target vertex location of the grid corresponding to the to-be-loaded expression data according to the next vertex location set, until target vertex locations corresponding to the grid of the to-be-loaded expression data are determined.

Figure 31:
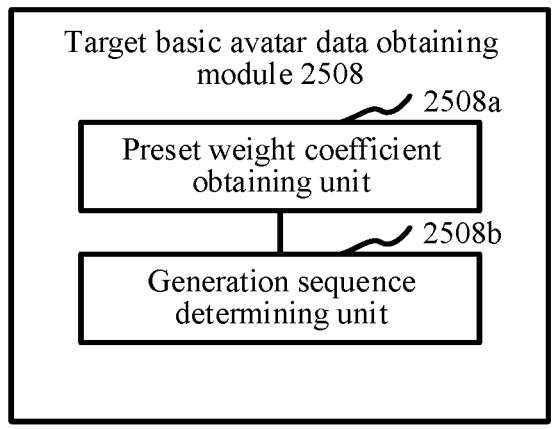
FIG. 31 is a structural block diagram of a target basic avatar data obtaining module according to an embodiment of the present disclosure.

As shown in FIG. 31, in an embodiment, the target basic-avatar-data obtaining module 2508 further includes a preset weight-coefficient obtaining unit 2508*a* and a generation sequence determining unit 2508*b*.

The preset weight-coefficient obtaining unit 2508*a* is configured to obtain preset weight-coefficients corresponding to the target expressions; and The generation sequence determining unit 2508*b* is configured to determine, according to a value relationship between the preset weight-coefficients corresponding to the target expressions, a sequence of generating to-be-loaded expression data corresponding to the target expressions.

In one embodiment, the animated avatar update module 2510 is further configured to sequentially load, according to the sequence of generating the to-be-loaded expression data corresponding to the target expressions, the to-be-loaded expression data into the target split-expression-area to update the expression of the animated avatar corresponding to the avatar model.

In an embodiment, the expression update data obtaining module 2504 is further configured to: perform feature point extraction on the current expression data to obtain a corresponding current expression feature point; and match the expression feature point with a preset expression data set to determine a current updated-to expression, and obtain expression change data corresponding to the current updated-to expression.

In an embodiment, the expression update data obtaining module 2504 is further configured to: obtain historical expression data, and perform feature point extraction on the historical expression data to obtain a corresponding historical expression feature point; perform feature point extraction on the current expression data to obtain a corresponding current expression feature point; and compare the historical expression feature point with the current expression feature point, and obtain corresponding expression change data according to a comparison result.

In an embodiment, the expression animation data processing apparatus is further configured to: obtain a corresponding first background image from preset background images according to the expression change data, and load the first background image into a virtual environment in which the animated avatar corresponding to the avatar model is located; or obtain voice data, obtain a corresponding second background image from preset background images according to the voice data, and load the second background image into a virtual environment in which the animated avatar corresponding to the avatar model is located.

Figure 32:
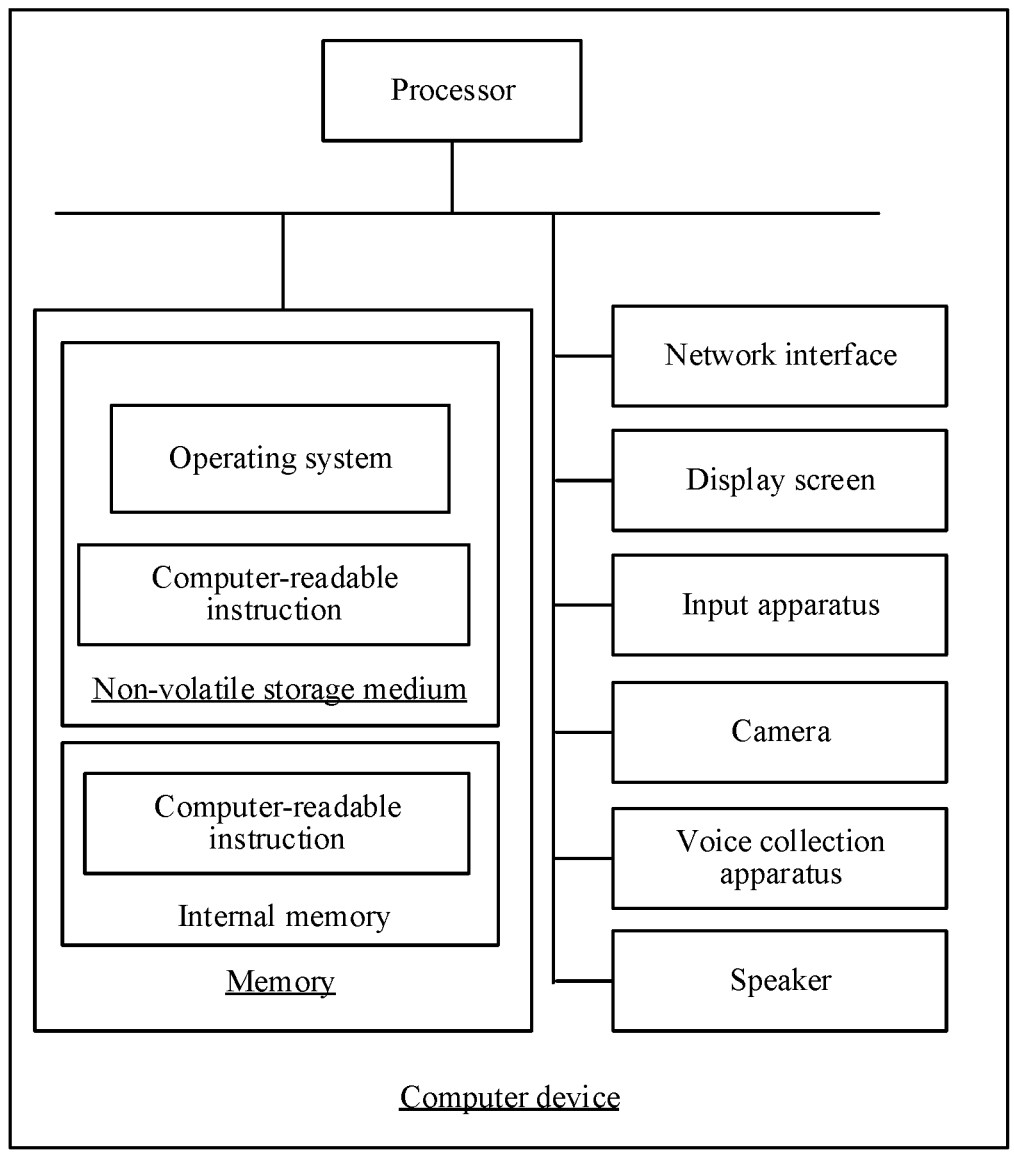
FIG. 32 is a structural block diagram of a computer device according to an embodiment of the present disclosure.

FIG. 32 is a diagram of an internal structure of a computer device according to an embodiment. The computer device may be specifically the terminal 110 in FIG. 1. As shown in FIG. 32, the computer device includes a processor, a memory, a network interface, an input apparatus, and a display screen that are connected by using a system bus. The memory includes a non-volatile storage medium and an internal memory. The non-volatile storage medium of the computer device stores an operating system, and may further store computer-readable instructions, the computer-readable instructions, when executed by the processor, causing the processor to implement the expression animation data processing method. The internal memory may also store computer-readable instructions, the computer-readable instructions, when executed by the processor, causing the processor to implement the expression animation data processing method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse or the like.

A person skilled in the art may understand that, the structure shown in FIG. 32 is merely a block diagram of a partial structure related to a solution in the present disclosure, and does not constitute a limitation to the computer device to which the solution in the present disclosure is applied. Specifically, the computer device may include more or fewer components than those shown in the figure, or some components may be combined, or a different component deployment may be used.

In an embodiment, the expression animation data processing apparatus provided in the present disclosure may be implemented in a form of computer-readable instructions, and the computer-readable instructions is executable on the computer device shown in FIG. 32. The memory of the computer device may store program modules forming the expression animation data processing apparatus, for example, the current expression data obtaining module, the expression update data obtaining module, the target split-expression-area detection module, the target basic-avatar-data obtaining module, and the animated avatar update module shown in FIG. 24. Computer-readable instructions constituted by the program modules cause the processor to perform the steps in the expression animation data processing method in the embodiments of the present disclosure described in this specification.

For example, the computer device shown in FIG. 32 may perform, by using the current expression data obtaining module in the expression animation data processing apparatus shown in FIG. 24, the step of obtaining current expression data according to a three-dimensional face model. The computer device may perform, by using the expression update data obtaining module, the step of obtaining expression change data from the current expression data.

In an embodiment, a computer device is provided, including a memory and a processor, the memory storing computer-readable instructions, and the computer-readable instructions, when executed by the processor, causing the processor to perform the following operations: determining a location of a human face in an image, and obtaining an avatar model; obtaining current expression data according to the location of the human face in the image and a three-dimensional face model; obtaining expression change data from the current expression data; determining a target split-expression-area that matches the expression change data, the target split-expression-area being selected from split-expression-areas corresponding to the avatar model; obtaining target basic-avatar-data that matches the target split-expression-area, and combining the target basic-avatar-data according to the expression change data to generate to-be-loaded expression data; and loading the to-be-loaded expression data into the target split-expression-area to update an expression of an animated avatar corresponding to the avatar model.

In an embodiment, the computer-readable instructions further cause the processor to perform the following operations: determining a first moving part corresponding to the animated avatar according to the expression change data; obtaining a second moving part associated with the first moving part; calculating motion status data corresponding to the first moving part according to the expression change data; determining bone control data corresponding to the second moving part according to the motion status data corresponding to the first moving part; and controlling a bone motion corresponding to the second moving part according to the bone control data, to update the expression of the animated avatar corresponding to the avatar model.

In an embodiment, in a case that the first moving part is a first preset part, the calculating motion status data corresponding to the first moving part according to the expression change data and the determining bone control data corresponding to the second moving part according to the motion status data corresponding to the first moving part include: calculating a yaw angular velocity and a pitch angular velocity corresponding to the first preset part according to the expression change data; determining first bone control data corresponding to the second moving part according to the pitch angular velocity, a preset maximum pitch angle threshold, and a first preset compensation value; determining second bone control data corresponding to the second moving part according to the yaw angular velocity, a preset maximum yaw angle threshold, and a second preset compensation value; and determining the bone control data corresponding to the second moving part according to the first bone control data and the second bone control data.

In an embodiment, in a case that the first moving part is a second preset part, the calculating motion status data corresponding to the first moving part according to the expression change data and the determining bone control data corresponding to the second moving part according to the motion status data corresponding to the first moving part include: calculating an expression-change-coefficient corresponding to the second preset part according to the expression change data; and determining the bone control data corresponding to the second moving part according to the expression-change-coefficient and a preset maximum pitch angle threshold.

In an embodiment, in a case that the first moving part is a third preset part, the calculating motion status data corresponding to the first moving part according to the expression change data and the determining bone control data corresponding to the second moving part according to the motion status data corresponding to the first moving part include: calculating an expression-change-coefficient corresponding to the third preset part according to the expression change data; calculating a pitch angle direction value and a yaw angle direction value corresponding to the third preset part according to the expression change data; determining first bone control data corresponding to the second moving part according to the expression-change-coefficient, the pitch angle direction value, and a preset maximum pitch angle threshold; determining second bone control data corresponding to the second moving part according to the expression-change-coefficient, the yaw angle direction value, and a preset maximum yaw angle threshold; and determining the bone control data corresponding to the second moving part according to the first bone control data and the second bone control data.

In an embodiment, the computer-readable instructions further cause the processor to perform the following operations: obtaining a reference point, determining a virtual space coordinate origin according to the reference point, and establishing a virtual space according to the virtual space coordinate origin; obtaining a relative location of a subject relative to the reference point; and determining a target location of an animated avatar corresponding to the subject in the virtual space according to the relative location, and generating an initial animated avatar corresponding to the subject in the virtual space according to the target location.

In an embodiment, the computer-readable instructions further cause the processor to perform the following operations: obtaining voice data, and determining a corresponding current second moving part according to the voice data; and obtaining a bone animation corresponding to the current second moving part, and playing the bone animation, to update the expression of the animated avatar corresponding to the avatar model.

In an embodiment, the determining a target split-expression-area that matches the expression change data includes: determining a current moving part corresponding to the animated avatar according to the expression change data;

obtaining a plurality of preset split-expression-areas corresponding to the avatar model; and obtaining a target split-expression-area that matches the current moving part from the plurality of preset split-expression-areas.

In an embodiment, the computer-readable instructions further cause the processor to perform the following operations: obtaining a current split-expression-area from the split-expression-areas corresponding to the avatar model; obtaining a sub basic avatar model set corresponding to the current split-expression-area; performing a plurality of different non-linear combinations on sub basic avatar models in the sub basic avatar model set to generate a plurality of corresponding sub mixed avatar models, to form a sub mixed avatar model set corresponding to the current split-expression-area; obtaining a next split-expression-area from the split-expression-areas as the current split-expression-area, and returning the operation of obtaining a sub basic avatar model set corresponding to the current split-expression-area, until sub mixed avatar model sets corresponding to the split-expression-areas are obtained; and forming basic-avatar-data by using the sub basic avatar model sets and the sub mixed avatar model sets corresponding to the split-expression-areas, the target basic-avatar-data being selected from the basic-avatar-data.

In an embodiment, the target basic-avatar-data includes a plurality of target sub basic avatar models and a plurality of target sub mixed avatar models, and the combining the target basic-avatar-data according to the expression change data to generate to-be-loaded expression data includes: calculating combination coefficients corresponding to the target sub basic avatar models and the target sub mixed avatar models according to the expression change data; and performing a linear combination on the plurality of target sub basic avatar models and the plurality of target sub mixed avatar models according to the combination coefficients to generate the to-be-loaded expression data.

In an embodiment, the loading the to-be-loaded expression data into the target split-expression-area includes: obtaining a current vertex location set, the current vertex location set including current vertex locations corresponding to target sub basic avatar models for generating the to-be-loaded expression data; determining a current target vertex location of a grid corresponding to the to-be-loaded expression data according to the current vertex location set; and obtaining a next vertex location set, and determining a next target vertex location of the grid corresponding to the to-be-loaded expression data according to the next vertex location set, until target vertex locations corresponding to the grid of the to-be-loaded expression data are determined.

In an embodiment, in a case that the expression change data corresponds to updates of a plurality of target expressions, the obtaining target basic-avatar-data that matches the target split-expression-area, and combining the target basic-avatar-data according to the expression change data to generate to-be-loaded expression data includes: obtaining preset weight-coefficients corresponding to the target expressions; and determining, according to a value relationship between the preset weight-coefficients corresponding to the target expressions, a sequence of generating to-be-loaded expression data corresponding to the target expressions; and the loading the to-be-loaded expression data into the target split-expression-area to update an expression of an animated avatar corresponding to the avatar model includes: sequentially loading, according to the sequence of generating the to-be-loaded expression data corresponding to the target expressions, the to-be-loaded expression data into the target split-expression-area to update the expression of the animated avatar corresponding to the avatar model.

In an embodiment, the obtaining expression change data from the current expression data includes: performing feature point extraction on the current expression data to obtain a corresponding expression feature point; and matching the expression feature point with a preset expression data set to determine a current updated-to expression, and obtaining expression change data corresponding to the current updated-to expression.

In an embodiment, the obtaining expression change data from the current expression data includes: obtaining historical expression data, and performing feature point extraction on the historical expression data to obtain a corresponding historical expression feature point; performing feature point extraction on the current expression data to obtain a corresponding current expression feature point; and comparing the historical expression feature point with the current expression feature point, and obtaining corresponding expression change data according to a comparison result.

In an embodiment, the computer-readable instructions further cause the processor to perform the following operations: obtaining a corresponding first background image from preset background images according to the expression change data, and loading the first background image into a virtual environment in which the animated avatar corresponding to the avatar model is located.

In an embodiment, the obtaining an avatar model includes: extracting a human face feature point from the human face in the image, and obtaining a corresponding avatar model according to the human face feature point; or obtaining an avatar model set, the avatar model set including a plurality of avatar models, obtaining an avatar model selection instruction, and obtaining a target avatar model from the avatar model set according to the avatar model selection instruction.

In an embodiment, a computer-readable storage medium is provided, storing computer-readable instructions, the computer-readable instructions, when executed by a processor, causing the processor to perform the following operations: determining a location of a human face in an image, and obtaining an avatar model; obtaining current expression data according to the location of the human face in the image and a three-dimensional face model; obtaining expression change data from the current expression data; determining a target split-expression-area that matches the expression change data, the target split-expression-area being selected from split-expression-areas corresponding to the avatar model; obtaining target basic-avatar-data that matches the target split-expression-area, and combining the target basic-avatar-data according to the expression change data to generate to-be-loaded expression data; and loading the to-be-loaded expression data into the target split-expression-area to update an expression of an animated avatar corresponding to the avatar model.

In an embodiment, the computer-readable instructions further cause the processor to perform the following operations: determining a first moving part corresponding to the animated avatar according to the expression change data; obtaining a second moving part associated with the first moving part; calculating motion status data corresponding to the first moving part according to the expression change data; determining bone control data corresponding to the second moving part according to the motion status data corresponding to the first moving part; and controlling a bone motion corresponding to the second moving part according to the bone control data, to update the expression of the animated avatar corresponding to the avatar model.

In an embodiment, in a case that the first moving part is a first preset part, the calculating motion status data corresponding to the first moving part according to the expression change data and the determining bone control data corresponding to the second moving part according to the motion status data corresponding to the first moving part include: calculating a yaw angular velocity and a pitch angular velocity corresponding to the first preset part according to the expression change data; determining first bone control data corresponding to the second moving part according to the pitch angular velocity, a preset maximum pitch angle threshold, and a first preset compensation value; determining second bone control data corresponding to the second moving part according to the yaw angular velocity, a preset maximum yaw angle threshold, and a second preset compensation value; and determining the bone control data corresponding to the second moving part according to the first bone control data and the second bone control data.

In an embodiment, in a case that the first moving part is a second preset part, the calculating motion status data corresponding to the first moving part according to the expression change data and the determining bone control data corresponding to the second moving part according to the motion status data corresponding to the first moving part include: calculating an expression-change-coefficient corresponding to the second preset part according to the expression change data; and determining the bone control data corresponding to the second moving part according to the expression-change-coefficient and a preset maximum pitch angle threshold.

In an embodiment, in a case that the first moving part is a third preset part, the calculating motion status data corresponding to the first moving part according to the expression change data and the determining bone control data corresponding to the second moving part according to the motion status data corresponding to the first moving part include: calculating an expression-change-coefficient corresponding to the third preset part according to the expression change data; calculating a pitch angle direction value and a yaw angle direction value corresponding to the third preset part according to the expression change data; determining first bone control data corresponding to the second moving part according to the expression-change-coefficient, the pitch angle direction value, and a preset maximum pitch angle threshold; determining second bone control data corresponding to the second moving part according to the expression-change-coefficient, the yaw angle direction value, and a preset maximum yaw angle threshold; and determining the bone control data corresponding to the second moving part according to the first bone control data and the second bone control data.

In an embodiment, the computer-readable instructions further cause the processor to perform the following operations: obtaining a reference point, determining a virtual space coordinate origin according to the reference point, and establishing a virtual space according to the virtual space coordinate origin; obtaining a relative location of a subject relative to the reference point; and determining a target location of an animated avatar corresponding to the subject in the virtual space according to the relative location, and generating an initial animated avatar corresponding to the subject in the virtual space according to the target location.

In an embodiment, the computer-readable instructions further cause the processor to perform the following operations: obtaining voice data, and determining a corresponding current second moving part according to the voice data; and obtaining a bone animation corresponding to the current second moving part, and playing the bone animation, to update the expression of the animated avatar corresponding to the avatar model.

In an embodiment, the determining a target split-expression-area that matches the expression change data includes: determining a current moving part corresponding to the animated avatar according to the expression change data; obtaining a plurality of preset split-expression-areas corresponding to the avatar model; and obtaining a target split-expression-area that matches the current moving part from the plurality of preset split-expression-areas.

In an embodiment, the computer-readable instructions further cause the processor to perform the following operations: obtaining a current split-expression-area from the split-expression-areas corresponding to the avatar model; obtaining a sub basic avatar model set corresponding to the current split-expression-area; performing a plurality of different non-linear combinations on sub basic avatar models in the sub basic avatar model set to generate a plurality of corresponding sub mixed avatar models, to form a sub mixed avatar model set corresponding to the current split-expression-area; obtaining a next split-expression-area from the split-expression-areas as the current split-expression-area, and returning the operation of obtaining a sub basic avatar model set corresponding to the current split-expression-area, until sub mixed avatar model sets corresponding to the split-expression-areas are obtained; and forming basic-avatar-data by using the sub basic avatar model sets and the sub mixed avatar model sets corresponding to the split-expression-areas, the target basic-avatar-data being selected from the basic-avatar-data.

In an embodiment, the target basic-avatar-data includes a plurality of target sub basic avatar models and a plurality of target sub mixed avatar models, and the combining the target basic-avatar-data according to the expression change data to generate to-be-loaded expression data includes: calculating combination coefficients corresponding to the target sub basic avatar models and the target sub mixed avatar models according to the expression change data; and performing a linear combination on the plurality of target sub basic avatar models and the plurality of target sub mixed avatar models according to the combination coefficients to generate the to-be-loaded expression data.

In an embodiment, the operation of loading the to-be-loaded expression data into the target split-expression-area includes: obtaining a current vertex location set, the current vertex location set including current vertex locations corresponding to target sub basic avatar models for generating the to-be-loaded expression data; determining a current target vertex location of a grid corresponding to the to-be-loaded expression data according to the current vertex location set; and obtaining a next vertex location set, and determining a next target vertex location of the grid corresponding to the to-be-loaded expression data according to the next vertex location set, until target vertex locations corresponding to the grid of the to-be-loaded expression data are determined.

In an embodiment, in a case that the expression change data corresponds to updates of a plurality of target expressions, the obtaining target basic-avatar-data that matches the target split-expression-area, and combining the target basic-avatar-data according to the expression change data to generate to-be-loaded expression data includes: obtaining preset weight-coefficients corresponding to the target expressions; and determining, according to a value relationship between the preset weight-coefficients corresponding to the target expressions, a sequence of generating to-be-loaded expression data corresponding to the target expressions; and the loading the to-be-loaded expression data into the target split-expression-area to update an expression of an animated avatar corresponding to the avatar model includes: sequentially loading, according to the sequence of generating the to-be-loaded expression data corresponding to the target expressions, the to-be-loaded expression data into the target split-expression-area to update the expression of the animated avatar corresponding to the avatar model.

In an embodiment, the obtaining expression change data from the current expression data includes: performing feature point extraction on the current expression data to obtain a corresponding expression feature point; and matching the expression feature point with a preset expression data set to determine a current updated-to expression, and obtaining expression change data corresponding to the current updated-to expression.

In an embodiment, the obtaining expression change data from the current expression data includes: obtaining historical expression data, and performing feature point extraction on the historical expression data to obtain a corresponding historical expression feature point; performing feature point extraction on the current expression data to obtain a corresponding current expression feature point; and comparing the historical expression feature point with the current expression feature point, and obtaining corresponding expression change data according to a comparison result.

In an embodiment, the computer-readable instructions further cause the processor to perform the following operations: obtaining a corresponding first background image from preset background images according to the expression change data, and loading the first background image into a virtual environment in which the animated avatar corresponding to the avatar model is located.

In an embodiment, the obtaining an avatar model includes: extracting a human face feature point from the human face in the image, and obtaining a corresponding avatar model according to the human face feature point; or obtaining an avatar model set, the avatar model set including a plurality of avatar models, obtaining an avatar model selection instruction, and obtaining a target avatar model from the avatar model set according to the avatar model selection instruction.

A person of ordinary skill in the art may understand that some or all procedures in the method in the foregoing embodiments may be implemented by a computer-readable instruction instructing related hardware, the program may be stored in a non-volatile computer-readable storage medium, and when the program is executed, the procedures in the foregoing method embodiments may be implemented. Any reference to a memory, a storage, a database, or other media used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

The technical features of the embodiments described above may be combined in any way. For brevity of description, possible combinations of the technical features in the foregoing embodiments are not exhausted, which, however, are to be considered as falling within the scope of this specification as long as there is no contradiction in the combinations of these technical features.

The foregoing embodiments show only several implementations of the present disclosure and are described in detail, which, however, are not to be construed as a limitation to the patent scope of the present disclosure. A person of ordinary skill in the art may further make several variations and improvements without departing from the ideas of the present disclosure, and such variations and improvements fall within the protection scope of the present disclosure. Therefore, the protection scope of this patent application is subject to the protection scope of the appended claims.

What is claimed is:

1. An expression animation data processing method for a computer device, the method comprising:
   determining a location of a human face in an image, and obtaining an avatar model;
   obtaining current expression data according to the location of the human face in the image, and a three-dimensional face model;
   obtaining expression change data from the current expression data;
   determining a target split-expression-area corresponding to a first moving part of an animated avatar of the avatar model according to the expression change data, the target split-expression-area being selected from split-expression-areas corresponding to the avatar model;
   obtaining target basic-avatar-data according to the target split-expression-area, and combining the target basic-avatar-data according to the expression change data to generate to-be-loaded expression data;
   obtaining a second moving part associated with the first moving part;
   calculating motion status data corresponding to the first moving part according to the expression change data, by:
      calculating a yaw angular velocity and a pitch angular velocity corresponding to the first moving part according to the expression change data;
      determining first bone control data corresponding to the second moving part according to the pitch angular velocity, a preset maximum pitch angle threshold, and a first preset compensation value; and
      determining second bone control data corresponding to the second moving part according to the yaw angular velocity, a preset maximum yaw angle threshold, and a second preset compensation value;
   determining bone control data corresponding to the second moving part according to motion status data, the motion status data including the first bone control data and the second bone control data; and
   loading the to-be-loaded expression data into the target split-expression-area and controlling a bone motion corresponding to the second moving part according to the bone control data to update an expression of an animated avatar corresponding to the avatar model.

2. The method according to claim 1, further comprising:
obtaining a reference point, determining a virtual space coordinate origin according to the reference point, and establishing a virtual space according to the virtual space coordinate origin;
obtaining a relative location of a subject relative to the reference point; and
determining a target location of an animated avatar corresponding to the subject in the virtual space according to the relative location, and generating an initial animated avatar corresponding to the subject in the virtual space according to the target location.

3. The method according to claim 1, further comprising:
obtaining voice data, and determining a corresponding current second moving part according to the voice data; and
obtaining a bone animation corresponding to the current second moving part, and playing the bone animation, to update the expression of the animated avatar corresponding to the avatar model.

4. The method according to claim 1, wherein the determining a target split-expression-area according to the expression change data comprises:
determining a current moving part corresponding to the animated avatar according to the expression change data;
obtaining a plurality of preset split-expression-areas corresponding to the avatar model; and
obtaining the target split-expression-area from the plurality of preset split-expression-areas.

5. The method according to claim 1, further comprising:
obtaining a current split-expression-area from the split-expression-areas corresponding to the avatar model;
obtaining a sub basic avatar model set corresponding to the current split-expression-area;
performing a plurality of different non-linear combinations on sub basic avatar models in the sub basic avatar model set to generate a plurality of corresponding sub mixed avatar models, to form a sub mixed avatar model set corresponding to the current split-expression-area;
obtaining a next split-expression-area from the split-expression-areas as the current split-expression-area, and returning the operation of obtaining a sub basic avatar model set corresponding to the current split-expression-area; and
forming basic-avatar-data by using the sub basic avatar model sets and the sub mixed avatar model sets corresponding to the split-expression-areas, the target basic-avatar-data being selected from the basic-avatar-data.

6. The method according to claim 1, wherein the target basic-avatar-data comprises a plurality of target sub basic avatar models and a plurality of target sub mixed avatar models, and the combining the target basic-avatar-data according to the expression change data to generate to-be-loaded expression data comprises:
calculating combination coefficients corresponding to the target sub basic avatar models and the target sub mixed avatar models according to the expression change data; and
performing a linear combination on the plurality of target sub basic avatar models and the plurality of target sub mixed avatar models according to the combination coefficients to generate the to-be-loaded expression data.

7. The method according to claim 1, wherein the operation of loading the to-be-loaded expression data into the target split-expression-area comprises:

obtaining a current vertex location set, the current vertex location set comprising current vertex locations corresponding to target sub basic avatar models for generating the to-be-loaded expression data;
determining a current target vertex location of a grid corresponding to the to-be-loaded expression data according to the current vertex location set; and
obtaining a next vertex location set, and determining a next target vertex location of the grid corresponding to the to-be-loaded expression data according to the next vertex location set.

8. The method according to claim 1, wherein: the expression change data corresponds to updates of target expressions, and the obtaining target basic-avatar-data according to the target split-expression-area, and combining the target basic-avatar-data according to the expression change data to generate to-be-loaded expression data comprises:
obtaining preset weight-coefficients corresponding to the target expressions; and
determining, according to a value relationship between the preset weight-coefficients corresponding to the target expressions, a sequence of generating to-be-loaded expression data corresponding to the target expressions; and the loading the to-be-loaded expression data into the target split-expression-area to update an expression of an animated avatar corresponding to the avatar model comprises:
loading, by the computer device according to the sequence of generating the to-be-loaded expression data corresponding to the target expressions, the to-be-loaded expression data into the target split-expression-area to update the expression of the animated avatar corresponding to the avatar model.

9. The method according to claim 1, wherein the obtaining expression change data from the current expression data comprises:
performing feature point extraction on the current expression data to obtain a expression feature point; and
comparing the expression feature point with a preset expression data set to determine a current updated-to expression, and obtaining the expression change data according to the current updated-to expression.

10. The method according to claim 1, wherein the obtaining expression change data from the current expression data comprises:
obtaining historical expression data, and performing feature point extraction on the historical expression data to obtain a historical expression feature point;
performing feature point extraction on the current expression data to obtain a current expression feature point; and
comparing the historical expression feature point with the current expression feature point, and obtaining corresponding expression change data according to a comparison result.

11. The method according to claim 1, further comprising:
obtaining a first background image from preset background images according to the expression change data; and
loading the first background image into a virtual environment in which the animated avatar of the avatar model is located.

12. The method according to claim 1, further comprising:
obtaining voice data, and obtaining a second background image from preset background images according to the voice data; and loading the second background image into a virtual environment in which the animated avatar of the avatar model is located.

13. The method according to claim 1, wherein the obtaining an avatar model comprises:
extracting a human face feature point from the human face in the image, and obtaining the avatar model according to the human face feature point.

14. The method according to claim 1, wherein the avatar model is a target avatar model, and the target avatar model is obtained by:
obtaining an avatar model set comprising a plurality of avatar models; and
obtaining an avatar model selection instruction, and obtaining the target avatar model from the avatar model set according to the avatar model selection instruction.

15. A computer device, comprising: a memory storing computer-readable instructions; and a processor coupled to the memory and, when executing the computer-readable instructions, configured to perform:
determining a location of a human face in an image, and obtaining an avatar model;
obtaining current expression data according to the location of the human face in the image and a three-dimensional face model;
obtaining expression change data from the current expression data;
determining a target split-expression-area corresponding to a first moving part of an animated avatar of the avatar model according to the expression change data, the target split-expression-area being selected from split-expression-areas corresponding to the avatar model;
obtaining target basic-avatar-data according to the target split-expression-area, and combining the target basic-avatar-data according to the expression change data to generate to-be-loaded expression data;
obtaining a second moving part associated with the first moving part;
calculating motion status data corresponding to the first moving part according to the expression change data, by:
calculating a yaw angular velocity and a pitch angular velocity corresponding to the first moving part according to the expression change data;
determining first bone control data corresponding to the second moving part according to the pitch angular velocity, a preset maximum pitch angle threshold, and a first preset compensation value; and
determining second bone control data corresponding to the second moving part according to the yaw angular velocity, a preset maximum yaw angle threshold, and a second preset compensation value;
determining bone control data corresponding to the second moving part according to motion status data, the motion status data including the first bone control data and the second bone control data; and
loading the to-be-loaded expression data into the target split-expression-area and controlling a bone motion corresponding to the second moving part according to the bone control data to update an expression of an animated avatar corresponding to the avatar model.

16. The computer device according to claim 15, wherein the processor is further configured to perform:
obtaining voice data, and determining a current second moving part according to the voice data; and
obtaining a bone animation corresponding to the current second moving part, and playing the bone animation, to update the expression of the animated avatar corresponding to the avatar model.

17. One or more non-transitory storage media storing computer-readable instructions, the computer-readable instructions, when executed by one or more processors, causing the one or more processors to perform:
determining a location of a human face in an image, and obtaining an avatar model;
obtaining current expression data according to the location of the human face in the image and a three-dimensional face model;
obtaining expression change data from the current expression data;
determining a target split-expression-area corresponding to a first moving part of an animated avatar of the avatar model according to the expression change data, the target split-expression-area being selected from split-expression-areas corresponding to the avatar model;
obtaining target basic-avatar-data according to the target split-expression-area, and combining the target basic-avatar-data according to the expression change data to generate to-be-loaded expression data;
obtaining a second moving part associated with the first moving part;
calculating motion status data corresponding to the first moving part according to the expression change data, by:
calculating a yaw angular velocity and a pitch angular velocity corresponding to the first moving part according to the expression change data;
determining first bone control data corresponding to the second moving part according to the pitch angular velocity, a preset maximum pitch angle threshold, and a first preset compensation value; and
determining second bone control data corresponding to the second moving part according to the yaw angular velocity, a preset maximum yaw angle threshold, and a second preset compensation value;
determining bone control data corresponding to the second moving part according to motion status data, the motion status data including the first bone control data and the second bone control data; and
loading the to-be-loaded expression data into the target split-expression-area and controlling a bone motion corresponding to the second moving part according to the bone control data to update an expression of an animated avatar corresponding to the avatar model.

18. The one or more non-transitory storage media according to claim 17, wherein the computer-readable instructions cause the one or more processors to further perform:
obtaining voice data, and determining a current second moving part according to the voice data; and
obtaining a bone animation corresponding to the current second moving part, and playing the bone animation, to update the expression of the animated avatar corresponding to the avatar model.

* * * * *